US011292176B2

(12) United States Patent
Cree et al.

(10) Patent No.: US 11,292,176 B2
(45) Date of Patent: Apr. 5, 2022

(54) HIGH PERFORMANCE COOLING SYSTEM

(71) Applicant: Addex, Inc., Newark, NY (US)

(72) Inventors: Robert E. Cree, Newark, NY (US); William J. Randolph, Farmington, NY (US)

(73) Assignee: Addex, Inc., Newark, NY (US)

(*) Notice: Subject to any disclaimer, the term of this patent is extended or adjusted under 35 U.S.C. 154(b) by 748 days.

(21) Appl. No.: 15/406,139

(22) Filed: Jan. 13, 2017

(65) Prior Publication Data

US 2017/0203488 A1    Jul. 20, 2017

Related U.S. Application Data

(63) Continuation-in-part of application No. 15/348,640, filed on Nov. 10, 2016, which is a
(Continued)

(51) Int. Cl.
*B29C 48/10* (2019.01)
*B29C 48/88* (2019.01)
(Continued)

(52) U.S. Cl.
CPC .......... *B29C 48/9125* (2019.02); *B29C 35/16* (2013.01); *B29C 48/0018* (2019.02);
(Continued)

(58) Field of Classification Search
CPC .......................... B29C 48/913; B29C 48/9125
See application file for complete search history.

(56) References Cited

U.S. PATENT DOCUMENTS 3,061,876 A * 11/1962 Lloyd ................... B29C 48/10
                                                                264/569
3,210,803 A    10/1965 Najar
(Continued)

FOREIGN PATENT DOCUMENTS

GB      1045899 A1    10/1966
JP      29370/79       8/1999

OTHER PUBLICATIONS

Kolarik, R. and Zatloukal, M., 2011. Modeling of nonisothermal film blowing process for non-Newtonian fluids by using variational principles. Journal of Applied Polymer Science, 122(4), pp. 2807-2820. (Year: 2011) (Year: 2011).*

(Continued)

*Primary Examiner* — Nicholas R Krasnow
(74) *Attorney, Agent, or Firm* — Timothy W. Menasco, Esq.; Harter Secrest & Emery LLP

(57) ABSTRACT

The present invention relates to an external cooling system for a molten film tube produced by a blown film tubular extrusion process, comprised of one or more enclosures with one or more respective cavities that directly receive a portion of cooling gas emanating from one or more associated cooling elements. Each enclosure includes a port containing a variable exhaust device and optional flow buffer, acting to maintain a pressure differential between the cavity and an adjacent inside volume of the molten film tube, adjustable to optimize molten film tube stability cooling element efficiency and spaced apart dimension between cooling elements. Additionally, at least one cooling element is provided, comprised of a divergent cooling element with a divergent cooling interface containing a cooling gas deflector spaced adjacent to the molten film tube and providing an expelled cooling gas.

20 Claims, 13 Drawing Sheets

Related U.S. Application Data continuation-in-part of application No. 14/997,082, filed on Jan. 15, 2016, now Pat. No. 11,104,054.

(51) Int. Cl.
*B29C 48/00* (2019.01)
*B29C 35/16* (2006.01)
*B29K 101/12* (2006.01)
*B29L 23/00* (2006.01)

(52) U.S. Cl.
CPC ............ *B29C 48/10* (2019.02); *B29C 48/913* (2019.02); *B29C 2035/1658* (2013.01); *B29C 2035/1666* (2013.01); *B29K 2101/12* (2013.01); *B29L 2023/001* (2013.01)

(56) References Cited

U.S. PATENT DOCUMENTS

| | | | |
|---|---|---|---|
| 3,507,006 A | 4/1970 | Princen | |
| 3,544,667 A * | 12/1970 | Steinhilber | A22C 13/0003 264/567 |
| 3,754,067 A | 8/1973 | St. Eve et al. | |
| 3,778,205 A * | 12/1973 | Turner | B29C 48/10 425/71 |
| 3,835,209 A | 9/1974 | Karabedian | |
| 3,852,392 A * | 12/1974 | Davis | B29C 48/10 264/569 |
| 3,867,083 A * | 2/1975 | Herrington | B29C 48/10 425/326.1 |
| 3,888,609 A | 6/1975 | St. Eve et al. | |
| 3,904,342 A * | 9/1975 | Sato | B29C 55/28 425/384 |
| 3,950,466 A * | 4/1976 | Hasler | B29C 48/10 264/565 |
| 3,959,425 A | 5/1976 | Herrington | |
| 3,976,732 A * | 8/1976 | Herrington | B29C 48/10 264/569 |
| 4,011,128 A * | 3/1977 | Suzuki | B29C 48/03 156/500 |
| 4,022,558 A | 5/1977 | Herrington | |
| 4,105,380 A * | 8/1978 | Zimmermann | B29C 48/10 425/72.1 |
| 4,115,048 A | 9/1978 | Alderfer et al. | |
| 4,118,453 A * | 10/1978 | Herrington | B29C 48/10 264/569 |
| 4,145,177 A | 3/1979 | Schott | |
| 4,174,932 A * | 11/1979 | Herrington | B29C 48/10 425/72.1 |
| 4,259,047 A * | 3/1981 | Cole | B29C 48/913 425/72.1 |
| 4,272,231 A | 6/1981 | Schott | |
| 4,330,501 A | 5/1982 | Jones et al. | |
| 4,373,273 A * | 2/1983 | Church | A43D 8/28 34/104 |
| 4,402,656 A * | 9/1983 | Schott, Jr. | G05D 5/06 425/140 |
| 4,447,387 A * | 5/1984 | Blakeslee, III | B29C 48/913 264/566 |
| 4,472,343 A * | 9/1984 | Kawamura | B29C 48/913 264/565 |
| 4,479,766 A * | 10/1984 | Planeta | B29C 48/10 425/72.1 |
| 4,505,657 A * | 3/1985 | Ikeya | B29C 48/913 425/72.1 |
| 4,606,879 A * | 8/1986 | Cerisano | B29C 48/92 264/565 |
| 4,632,801 A * | 12/1986 | Dowd | B29C 48/10 264/566 |
| 4,728,277 A * | 3/1988 | Planeta | B29C 48/10 425/72.1 |
| 4,749,346 A * | 6/1988 | Planeta | B29C 48/10 425/72.1 |
| 4,826,414 A * | 5/1989 | Planeta | B29C 48/10 425/72.1 |
| 4,842,803 A * | 6/1989 | Bose | B29C 48/10 264/565 |
| 4,846,645 A * | 7/1989 | Cole | B29C 48/10 425/72.1 |
| 4,865,785 A * | 9/1989 | Zwick | B01D 63/061 264/48 |
| 4,929,162 A * | 5/1990 | Planeta | B29C 48/913 425/72.1 |
| 4,994,324 A * | 2/1991 | Bose | B32B 27/32 428/349 |
| 5,288,219 A * | 2/1994 | Smith | B29C 48/92 425/72.1 |
| 5,368,460 A * | 11/1994 | Weavil | B29C 48/10 425/72.1 |
| 5,403,539 A * | 4/1995 | Taka | B29C 48/913 264/565 |
| 5,700,489 A * | 12/1997 | Pottorff | B29C 48/09 425/72.1 |
| 6,068,462 A * | 5/2000 | Wybenga | B29C 48/10 425/72.1 |
| 6,196,827 B1 * | 3/2001 | Pottorff | B29C 48/06 425/326.1 |
| 6,273,699 B1 * | 8/2001 | Finke | B29C 48/92 425/72.1 |
| 6,783,344 B1 * | 8/2004 | Rudolf | B29C 48/92 425/72.1 |
| 8,956,136 B2 | 2/2015 | Zimmermann | |
| 10,391,697 B2 * | 8/2019 | Cree | B29C 48/0018 |
| 2002/0158360 A1 * | 10/2002 | Joseph | B29C 48/9125 264/40.3 |
| 2005/0056973 A1 * | 3/2005 | Ooyama | B29C 48/10 264/510 |
| 2005/0100623 A1 * | 5/2005 | Watanabe | B29C 48/10 425/71 |
| 2005/0285315 A1 * | 12/2005 | Fahling | B29C 48/903 264/568 |
| 2008/0061460 A1 * | 3/2008 | Zimmermann | B29C 48/92 264/40.1 |
| 2008/0258325 A1 | 10/2008 | Zimmermann | |
| 2009/0014924 A1 * | 1/2009 | Ohlendorf | B29C 48/10 264/565 |
| 2011/0171449 A1 * | 7/2011 | Lehrter | C08J 9/228 428/220 |
| 2012/0168993 A1 * | 7/2012 | Georgelos | B29C 48/03 264/510 |
| 2014/0057010 A1 * | 2/2014 | Rubbelke | B29C 48/08 425/72.1 |
| 2016/0158990 A1 * | 6/2016 | Steuter | B29C 48/32 264/40.1 |
| 2016/0250794 A1 * | 9/2016 | Parker | B29C 48/9125 425/72.1 |
| 2017/0203489 A1 * | 7/2017 | Cree | B29C 48/0018 |
| 2017/0203490 A1 * | 7/2017 | Cree | B29C 49/0015 |
| 2017/0239867 A1 * | 8/2017 | Wybenga | B29C 48/10 |
| 2018/0126616 A1 * | 5/2018 | Ponsiani | B29C 55/28 |

OTHER PUBLICATIONS

Whelan, A. and Dunning, D. eds., 2012. Developments in Plastics Technology—1: Extrusion. Springer Science & Business Media. Chapter 3 (Year: 2012) (Year: 2012).*

Dowd, Laurence E., "Air Ring Selection for Blown Packaging Film", Journal of Plastic Film and Sheeting, vol. 1—Jul. 1985 #8756-0879/85/03 0226-13, 1(3), pp. 226-238 (Year: 1985).

* cited by examiner

1002: (a) providing a flow of a molten film tube from a blown film die; (b) cooling the flow of the molten film tube by a first cooling element and a spaced apart second cooling element, the first cooling element and the second cooling element each comprising a divergent cooling element having a divergent cooling interface operable for expelling a cooling gas (i) in a path opposing the flow of the molten film tube toward a first exit gap and (ii) in a path with the flow of the molten film tube toward a second exit gap; and (c) receiving the flow of the molten film tube by a first stabilizer ring and a second stabilizer ring, the first stabilizer ring and the second stabilizer ring each operably stacked between the first cooling element and the second cooling element.

1004: wherein the first stabilizer ring and the second stabilizer ring are each sufficiently spaced from the molten film tube to allow a flow of expelled cooling gas between the first and the second stabilizing rings and the molten film tube.

1006: wherein the first stabilizer ring is spaced from the first cooling element to allow a flow of expelled cooling gas between the first cooling element and the first stabilizer ring, and wherein the second stabilizer ring is spaced from the second cooling element to allow a flow of expelled cooling gas between the second cooling element and the second stabilizer ring.

1008: the method further comprising receiving the flow of molten film tube by a spaced apart third stabilizer ring and a spaced apart fourth stabilizer ring, each operably stacked between the first and the second cooling elements.

1010: wherein the first stabilizer ring, the second stabilizer ring, the third stabilizer ring, the fourth stabilizer ring, the first cooling element, and the second cooling element are each spaced from one another to allow a flow of expelled cooling gas there between.

FIG. 10

HIGH PERFORMANCE COOLING SYSTEM

BACKGROUND OF THE INVENTION

Field of the Invention

The present disclosure relates to a method and apparatus for cooling. The present disclosure relates more particularly to a method and apparatus for high performance cooling.

Description of Related Art

Various methods to manufacture thermoplastic blown films are well known in the plastics art, and typically involve forming a continuous, vertically oriented, seamless, annular plastic film commonly referred to as the "tube" or "bubble". Thermoplastic material is melted and pumped by an extruder through a blown film die (die), exiting as an annular flow of a molten film, continuously drawn upward by a pair of driven squeeze rollers. Gas is typically manually injected through the die to the interior of the exiting annular flow of molten film. The driven squeeze rollers act to prevent gas from escaping, trapping the injected gas inside, forming a molten film tube which is inflated by the injected gas until at the desired size and the die is sealed off to prevent inflation gas from escaping. The molten film tube is pulled upward by the driven squeeze rollers, flowing generally upward from the die through a cooling system, where it stretches, expands, and cools around the now trapped column of injected gas until it solidifies at a frost line into a solidified film tube. The solidified film tube passes through various stabilizers and enters a flattening device, which converts the tube into a flattened double thickness thermoplastic sheet of film known as "lay-flat". The lay-flat passes through the driven squeeze rollers, and is conveyed to downstream converting equipment such as winders and bag making machines for further processing.

To remain competitive, manufacturers of blown film must maximize throughput rate and quality, however cooling system performance is a significant limiting factor. The weight of thermoplastic that is extruded per unit time divided by the circumference of the die exit, provides a commonly used measure of throughput performance, and is expressed in units of PPH/Inch, Pounds Per Hour per Inch of die exit circumference. Many different cooling systems have been developed and employed, both external and internal to the tube, and to varying degrees these systems have achieved commercial success.

Blown film cooling systems provide a flow of cooling gas typically external, but in many cases also internal to the molten film tube. Cooling systems are designed using well known Bernoulli and Coandă principles, and in many cases, apply the cooling gas to flow generally along the surface of the molten film tube to create holding forces on the molten film tube, providing for both stability and cooling of the molten film tube. Excessive holding forces, if present, can cause vibration, flutter, and high noise levels in the process, and can pull the molten film tube into undesirable contact with the cooling element, creating drag and causing marks and instability in the molten film tube. In other cases, cooling gas is instead applied generally against the surface of the molten film tube, typically creating turbulent cooling with repelling forces, requiring a separate means to stabilize the molten film tube.

External cooling systems, generally provide the primary means for stabilization and cooling of the molten film tube, are generally easy to operate and used on most blown film extrusion processes. External cooling systems provide a flow of cooling gas along the outside surface of the molten film tube that typically generates holding forces while cooling the molten film tube, until the cooling gas dissipates into the surrounding atmosphere. Less typically, cooling gas is aimed generally inward generating repelling forces while cooling the molten film tube, undesirably requiring a separate means to hold and stabilize the molten film tube.

Present art external cooling systems are made up of various types of cooling elements. The earliest cooling element, known as a "Single Flow air ring", still in common use today, applies a single flow of cooling gas around the molten film tube. Single Flow cooling elements typically produce good film quality, but at lower throughput rates. Additional flows of cooling gas have been added to cooling elements over time to create various multiple flow designs, such as "Dual Flow", "Triple Flow" or "Quad Flow" designs, and some external cooling systems pair cooling elements into various configurations, depending on the application, to form what is generically known as a "Tandem" air ring. External cooling systems are typically fixed in place, but can be made adjustable in height above the die to allow extending the cooled surface area along the molten film tube, producing higher throughput, but also resulting in greater unsupported surface area between the cooling element and die, which is the hottest and weakest portion of the molten film tube, which can lead to degraded stability, making it more difficult to operate and potentially leading to a narrower range of film sizes.

In contrast, internal cooling systems typically do not provide primary stabilization, and are selectively used typically to generate additional throughput beyond the capability of an external cooling system. Internal cooling systems replace manual gas injection and inflate the molten film tube with a flow of an internal supply gas that enters through the die. Although some recent high throughput internal cooling systems apply cooling gas to create holding forces, more typically cooling gas is directed against the inside surface of the molten film tube, acting to generally repel and cool the inside surface of the molten film tube. The flow of internal supply gas is trapped inside the bubble and cannot dissipate into the atmosphere, therefore complex control systems are used to balance a flow of internal exhaust gas that exits through the die to maintain a constant bubble size as is well known and understood by those skilled in the art. Internal cooling systems can be difficult or even impossible to use depending on such factors as operator skill, thermoplastic material properties, and the physical size and design of the associated die.

It is highly desired to overcome the drawbacks of prior art thermoplastic cooling systems and provide a cooling system that significantly increases throughput rate, maximizes aerodynamic holding forces, allows relatively large unsupported regions of the molten tube with good stability, produces a wide range of film sizes, prevents drag on the molten film surface, minimizes turbulence, vibration and flutter, does not produce high sound power levels, and is simple and easy to control.

SUMMARY OF THE INVENTION

In view of the foregoing, it is an object of the present disclosure to provide a method and apparatus for cooling.

A first exemplary embodiment of the present disclosure presents an apparatus for cooling. The apparatus includes a blown film die operable for producing a flow of a molten film tube and at least one cooling element for receiving the flow of the molten film tube, the at least one cooling element including a divergent cooling element having a divergent cooling interface operable for expelling a cooling gas (i) in a path opposing the flow of the molten film tube toward a first exit gap and (ii) in a path with the flow of the molten film tube toward a second exit gap. The apparatus further including at least one enclosure including a cavity operable for receiving at least a portion of the cooling gas from the at least one cooling element to substantially maintain a predetermined pressure differential between an inside surface and an outside surface of the flow of the molten film tube.

A second exemplary embodiment includes wherein at least one of the first exit gap and the second exit gap defines a minimum gap between the divergent cooling interface and the flow of the molten film tube.

A third exemplary embodiment includes wherein the at least one cooling element is stackable.

A fourth exemplary embodiment, wherein the at least one enclosure includes a port maintaining a variable exhaust device operable for expelling at least a portion of the cooling gas from the cavity through the port to a surrounding atmosphere to maintain the predetermined pressure differential.

A fifth exemplary embodiment of the present disclosure presents a method for cooling. The method includes providing a flow of a molten film tube from a blown film die. The method further includes cooling the flow of the molten film tube by at least one cooling element, the at least one cooling element comprising a divergent cooling element having a divergent cooling interface operable for expelling a cooling gas (i) in a path opposing the flow of the molten film tube toward a first exit gap and (ii) in a path with the flow of the molten film tube toward a second exit gap, wherein at least a portion of the expelled cooling gas is received by at least one enclosure comprising a cavity operable to maintain a predetermined pressure differential between an inside surface and an outside surface of the flow of the molten film tube.

A sixth exemplary embodiment of the present disclosure presents an apparatus for cooling. The apparatus includes a blown film die operable for producing a flow of a molten film tube, and a first cooling element for receiving the flow of the molten film tube, the first cooling element comprising a divergent cooling element having a divergent cooling interface operable for expelling a cooling gas (i) in a path opposing the flow of the molten film tube toward a first exit gap and (ii) in a path with the flow of the molten film tube toward a second exit gap. The apparatus further includes a second cooling element for receiving the flow of the molten film tube, the second cooling element comprising a divergent cooling element having a divergent cooling interface operable for expelling a cooling gas (i) in a path opposing the flow of the molten film tube toward a first exit gap and (ii) in a path with the flow of the molten film tube toward a second exit gap, wherein the second cooling element is operably stacked adjacent the first cooling element. The apparatus still further includes a first stabilizer ring operably stacked adjacent the first cooling element between the first and the second cooling elements, and a second stabilizer ring operably stacked adjacent the second cooling element between the first stabilizer ring and the second cooling element.

A seventh exemplary embodiment of the present disclosure presents a method for cooling. The method includes providing a flow of a molten film tube from a blown film die, and cooling the flow of the molten film tube by a first cooling element and a spaced apart second cooling element, the first cooling element and the second cooling element each comprising a divergent cooling element having a divergent cooling interface operable for expelling a cooling gas (i) in a path opposing the flow of the molten film tube toward a first exit gap and (ii) in a path with the flow of the molten film tube toward a second exit gap. The method further includes receiving the flow of the molten film tube by a first stabilizer ring and a second stabilizer ring, the first stabilizer ring and the second stabilizer ring each operably stacked between the first cooling element and the second cooling element.

An eighth exemplary embodiment of the present disclosure presents an apparatus for cooling. The apparatus includes a blown film die operable for producing a flow of a molten film tube, and a first cooling element for receiving the flow of the molten film tube, the first cooling element having a cooling interface operable for expelling a cooling gas in a path with the flow of the molten film tube. The apparatus further includes a second cooling element for receiving the flow of the molten film tube, the second cooling element having a cooling interface operable for expelling a cooling gas at least in a path opposing the flow of the molten film tube toward the first cooling element, and a first stabilizer ring operably stacked adjacent the first cooling element between the first and the second cooling elements. The apparatus still further includes a second stabilizer ring operably stacked adjacent the second cooling element between the first stabilizer ring and the second cooling element.

A ninth exemplary embodiment of the present disclosure presents an apparatus for cooling. The apparatus includes a blown film die operable for producing a flow of a molten film tube, and a unidirectional cooling element for receiving the flow of the molten film tube, the unidirectional cooling element having a unidirectional cooling interface operable for expelling a cooling gas in a path with the flow of the molten film tube toward a first exit gap. The apparatus further includes a divergent cooling element for receiving the flow of the molten film tube operably stacked adjacent the unidirectional cooling element, the divergent cooling element having a divergent cooling interface operable for expelling a cooling gas (i) in a path opposing the flow of the molten film tube toward a second exit gap and (ii) in a path with the flow of the molten film tube toward a third exit gap. The expelled cooling gas from the second cooling element in a path opposing the flow of the molten film tube directed toward the first cooling element, and a first stabilizer ring operably stacked adjacent the first cooling element between the first and the second cooling elements.

A tenth exemplary embodiment of the present disclosure provides a method of cooling. The method includes providing a flow of a molten film tube from a blown film die, and cooling the flow of the molten film tube by a unidirectional cooling element and a spaced apart divergent cooling element, the unidirectional cooling element having a unidirectional cooling interface operable for expelling a cooling gas in a path with the flow of the molten film tube toward a first exit gap, the divergent cooling element having a divergent cooling interface operable for expelling a cooling gas (i) in a path opposing the flow of the molten film tube toward a second exit gap and (ii) in a path with the flow of the molten film tube toward a third exit gap The following will describe embodiments of the present invention, but it should be appreciated that the present invention is not limited to the described embodiments and various modifications of the invention are possible without departing from the basic principles. The scope of the present disclosure is therefore to be determined solely by the appended claims.

BRIEF DESCRIPTION OF THE DRAWINGS

FIG. 10 is a logic flow diagram in accordance with a method and apparatus for performing alternate exemplary embodiments of this disclosure.

DETAILED DESCRIPTION OF THE INVENTION

Figure 1:
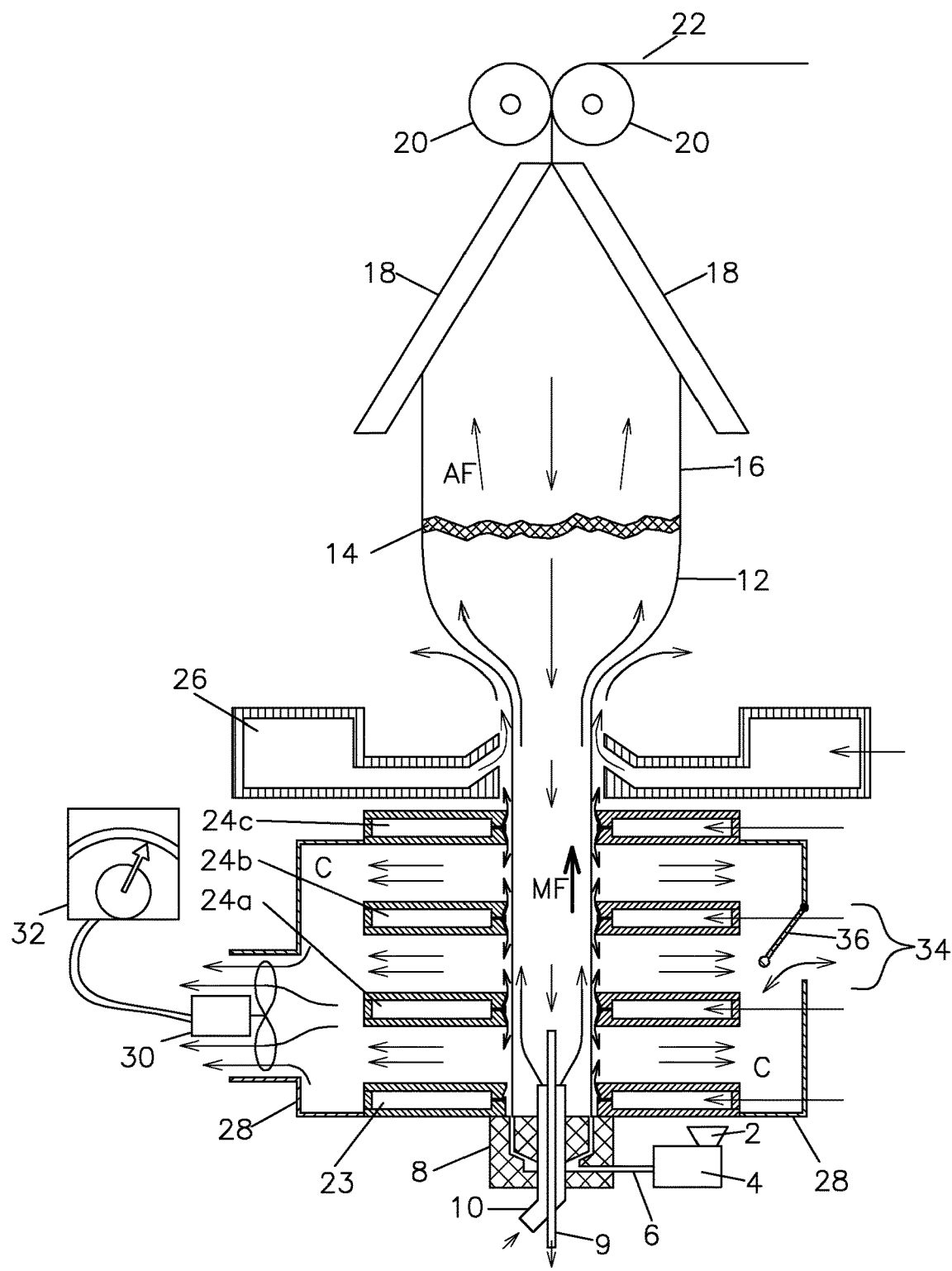
FIG. 1 is a cross sectional view of a device suitable for use in practicing exemplary embodiments of this disclosure.

Exemplary embodiments of the present disclosure relate to a high performance cooling system for the blown film tubular extrusion process providing increased throughput rate at high quality. Embodiments of the high performance cooling system optionally include one or more enclosures or controlled pressure enclosures, creating a gas volume cavity (cavity) around the molten film tube that is isolated from the surrounding atmosphere. The cavity directly receives at least a portion of cooling gas that emanates, generally along the outside surface of the molten film tube, from one or more associated cooling elements. The extents of the cavity are formed by the combination of enclosure walls, the portion of the cooling elements in contact with the cavity (also referred to as the cooling element cavity portion), and the portion of the molten film tube in contact with the cavity (also referred to as the molten film cavity portion).

Each enclosure incorporates a variable exhaust device that adjustably transfers gas through a port in the enclosure, from the associated cavity to the surrounding atmosphere, allowing for pressure adjustment relative to the surrounding atmosphere of the cavity within each enclosure. A substantially constant internal tube pressure, usually much less than 1" H2O (relative to the surrounding atmosphere), is generated as the molten film tube stretches and forms around the trapped internal gas volume contained within the molten film tube. Resulting cavity pressure acts directly on the outside surface of the molten film cavity portion, and internal tube pressure acts directly on the inside surface of the molten film cavity portion, to create a predetermined pressure differential across the molten film cavity portion. The predetermined pressure differential is adjusted to maximize the stability of the molten film cavity portion and the cooling efficiency of the cooling element cavity portion, to provide higher throughput rate, and better film quality.

The variable exhaust device preferably would be a fan means, chosen with operating characteristics adjustable to prevent creating a predetermined pressure differential large enough to stretch the flow of the molten film tube and thus the molten film cavity portion in between the cooling elements and hang up on associated cooling elements, causing an interruption in the flow of the molten film tube. Typical fan designs have well defined and wide range of operating characteristics, published as "fan curves", easily chosen by those skilled in the art. To simplify adjustment of predetermined pressure differential, allow for a broader selection of variable exhaust device, and further prevent hang ups, an optional flow buffer can be added to each enclosure to allow gas to exchange between the cavity and the surrounding atmosphere. The simplest form of a flow buffer is a passage through the wall of the enclosure fluidly connecting the cavity to the surrounding atmosphere. As gas flow through the variable exhaust device is adjusted relative to the cooling gas cavity portion, a flow of gas through the passage occurs. The flow of gas through the passage creates an associated passage pressure drop relative to surrounding atmospheric pressure, which establishes cavity pressure to create the desired predetermined pressure differential. The variable exhaust device and passage are sized to generate the desired range of predetermined pressure differential, over the expected range of cooling gas flow, acting together to form a fast acting cavity pressure regulator.

Advantageously, a freely swinging flapper hangs by gravity generally inside the flow buffer passage. When cavity pressure equals atmospheric pressure, no gas flows through the passage, and the flapper hangs straight down creating a maximum obstruction in the passage. As predetermined pressure differential adjustments are made, gas flow through the passage changes, causing a variable deflection of the flapper which variably obstructs the passage in the direction the flow of gas through the passage. The position of the flapper provides an easy to interpret, visual indication of direction and quantity of the flow of gas through the passage.

Pressure regulating characteristics of the flow buffer can easily be set by giving the flapper a predetermined weight and geometry. The geometry of the passage can also take many forms (i.e. shapes) to achieve very smooth, fast acting pressure regulation, easily adjusted by the variable exhaust device. Embodiments of the flow buffer include more complex designs provided they allow for variable gas exchange with associated defined pressure drop between the cavity and the surrounding atmosphere.

Also provided, are one or more cooling elements, capable of being stacked to achieve higher throughput, wherein at least one of the one or more cooling elements is a divergent cooling element incorporating a cooling gas deflector and a pair of opposed cooling members having respective opposed air foil surfaces (surfaces). The surfaces and cooling gas deflector form a divergent cooling interface that directs cooling gas to flow in opposite directions, creating suction forces. These suction forces stabilize and hold the molten film tube (melt) in cooling proximity with the divergent cooling element. Oppositely directed cooling gas flows are expelled between the divergent cooling interface and the melt (i) in a path opposing the flow of the molten film tube along a first surface toward a first air foil exit tip to form a first exit gap with the melt and (ii) in a path with the flow of the molten film tube along a second surface toward a second air foil exit tip to form a second exit gap with the melt.

The divergent cooling interface includes air foil exit tips that are angled inward toward the surface of the molten film tube, and extend closer to the molten film tube than any other portion of the divergent cooling element. All portions of the divergent cooling interface are recessed within the air foil exit tips away from the molten film tube, preventing hang-up inducing drag. The angled in air foil exit tips act to compress the cooling gas stream, providing a cushioning effect that dampen vibrations and flutter in the molten film tube, and eliminate excessive sound power levels. Additionally, the angled in air foil exit tips act similar to a venturi, to accelerate the cooling gas streams flowing along the molten film tube to a higher velocity where the cooling gas streams emerge from the influence of associated cooling members at the air foil exit tips and flow along the molten film tube. This higher velocity cooling gas flow translates into higher cooling efficiency and throughput.

Further, one or more compound angles are preferentially employed along the air foil surfaces. Larger surface angles (up to about 45 degrees from parallel to the molten film surface) provide greater compression of the cooling gas, which desirably improves cooling efficiency, but unfortunately, also can cause an undesirable reduction in holding force. Use of compound angles wraps the cooling gas flow smoothly around cooling element air foil surfaces, which are advantageously arranged to change from a larger to a smaller angle relative to the molten film tube, in the direction of cooling gas flow, prior reaching the air foil exit tips. This approach allows larger initial cooling member air foil surface angles which act to aggressively compress the cooling gas streams for maximum cooling efficiency, followed by smaller surface angles, just prior and up to the air foil exit tips, which act to accelerate the cooling gas streams, restoring holding force to a maximum. Divergent cooling elements with compound angles in the cooling member air flow surfaces, exhibit very high cooling efficiency, maximum holding force, and excellent stability, without vibration, flutter or high sound power levels.

Advantageously, a simplified single air delivery channel is provided between first and second cooling members, feeding an inward radial flow of cooling gas arranged to impinge on an outer wall of a cooling gas deflector, preventing direct cooling gas flow against the blown film tube and separating the flow into oppositely directed first and second annular cooling gas streams. The cooling gas deflector generally arranged intermediate between the cooling members and the molten tube such that the inner wall of the cooling gas deflector is spaced further from the molten tube than the associated cooling member tips to prevent drag. Additional flows of cooling gas can be advantageously added, but are not required.

Embodiments of the present disclosure include a single enclosure with flow buffer, surrounding a four (4) level Short Stack arrangement incorporating high performance cooling elements with one or more compound angle cooling member air foil surfaces of 22.5 degrees, followed by 7.5 degree air foil exit tips. Embodiments further include a conventional Dual Flow cooling means placed on top of the stack, with the normal Dual Flow lower flow of air replaced by the upper most flow of air from the stack. Stable operation of the embodiments of this disclosure can be achieved with a spaced apart dimension between cooling elements greater than 4 inches. Further, zero internal pressure within the molten film tube can be achieved, providing stable straight up (from the final cooling element) tube formation. Additionally, internal tube pressure can be increased yielding the full range of larger film sizes normally able to be produced. Throughput rates can be increased in excess of 65% over conventional Dual Flow cooling means.

FIG. 1 shows a cross sectional view of a typical blown film extrusion process employing an enclosure 28 and short stack cooling system employing divergent cooling elements of the present invention. In FIG. 1-FIG. 6, all thin arrows indicating a direction are for illustrative purposes only, labeled for example as AF, and indicate a direction flow of a fluid (e.g. cooling gas). Further, Thick arrows indicating a direction are for illustrative purposes only, labeled for example as MF, and indicate a direction flow of a plastic film material (e.g. molten film tube). Thermoplastic resin is introduced through feed hopper 2 into extruder 4 where the resin is melted, mixed and pressurized. Molten resin is conveyed through melt pipe 6 into a die means 8 that forms it into an annular molten flow that exits generally from the top surface of die means 8 as a molten film tube 12.

Internal gas supply conduit 10 operably provides an internal cooling/inflating gas through die means 8 to the interior of molten film tube 12 and solidified film tube 16. Internal gas exhaust conduit 9 operably removes internal cooling/inflating gas through die means 8 as required to maintain a desired trapped tube volume of gas inside molten film tube 12 and solidified film tube 16, further contained by nip rollers 20. Gas flow through Internal gas supply conduit 10 and Internal gas exhaust conduit 9 are controlled by methods commonly understood by those skilled in the art. Molten film tube 12 expands outwardly around the trapped tube volume of gas and is drawn upwardly by nip rollers 20 while being cooled to solidify at freeze line 14 forming solidified film tube 16. Solidified film tube 16 is collapsed by flattening guides 18 before passing through nip rollers 20 forming flattened film 22. Flattened film 22 is then conveyed to downstream equipment for conversion into usable products as desired.

Annular cooling elements 23, 24a-c, and 26 are arranged coaxial with and in the direction of flow of molten film tube 12. Cooling elements 23, 24a-c, and 26, each supplied with cooling gas from a suitable external source, direct associated cooling gas alongside molten film tube 12, generally in the same and/or opposite direction to the flow of molten film tube 12, acting to stabilize and cool molten film tube 12.

Upward cooling gas traveling generally in the direction of flow of molten film tube 12 from cooling elements 23 and 24a-b, and downward cooling gas traveling generally opposite the direction of flow of molten film tube 12 from cooling elements 24a-c, flows directly into a cavity C around molten film tube 12. Cavity C is contained and isolated from the surrounding atmosphere by enclosure 28 with additional extents formed by the portion of the cooling elements 23 and 24a-c in contact with cavity C (cooling element cavity portion), and the portion of the molten film tube 12 in contact with cavity C (molten film cavity portion). Cooling gas entering cavity C flows alongside and cools molten film tube 12, and exhausts between cooling elements 23 and 24a-c, and is collected for further processing by enclosure 28. Generally upwardly directed cooling gas from cooling element 26 flows unrestricted, along molten film tube 12, directly influenced by the surrounding atmosphere, while cooling and allowing for free expansion of molten film tube 12.

Variable exhaust device 30, installed in a port passing through enclosure 28, conveys gas from cavity C to the surrounding atmosphere. The choice of variable exhaust device 30 is important. If variable exhaust device 30 is too big or powerful, excessive cavity C pressures could develop inside enclosure 28 sufficient to cause hang-ups of molten film tube 12. Variable exhaust device 30 is preferably chosen to be of a low pressure, high flow design, sufficient to provide desired pressures and flows. The pressure of cavity C relative to the surrounding atmosphere is adjusted by variable exhaust device 30 using a variable controller means 32, to create a predetermined pressure differential across the molten film cavity portion that maximizes the stability of the molten film cavity portion and the cooling efficiency of the cooling element cavity portion, to provide higher throughput rate, and better film quality.

Embodiments of enclosure 28 may include a flow buffer 34, minimally including a passage through the wall of enclosure 28 fluidly connecting cavity C to the surrounding atmosphere. As gas flow through the variable exhaust device 30 is adjusted relative the cooling gas entering cavity C, the flow of gas through flow buffer 34 changes. The flow of gas flow buffer 34 creates an associated pressure drop relative to surrounding atmospheric pressure, which establishes cavity C pressure and the associated predetermined pressure differential across the molten film cavity portion.

Selectively added freely swinging flapper 36 hangs by gravity generally inside the passage of flow buffer 34. When cavity C pressure equals atmospheric pressure, no gas flows through flow buffer 34, and the flapper hangs straight down creating a maximum obstruction in the passage. As predetermined pressure differential adjustments are made, gas flows through flow buffer 34, causing a variable deflection of flapper 36 which variably obstructs flow buffer 34 in the direction the flow of gas through the passage. The position of flapper 36 provides an easy to interpret, visual indication of direction and quantity of the flow of gas through flow buffer 34. Depending on the choice of variable exhaust device 30, the characteristics of optional flow buffer 34 can easily be set by predetermining the weight and geometry of flapper 36 and the passage geometry of flow buffer 34 to achieve very smooth, fast acting regulation of cavity C pressure, over the desired range of predetermined pressure differential across the molten film cavity portion, adjustable by variable controller means 32.

Figure 2:
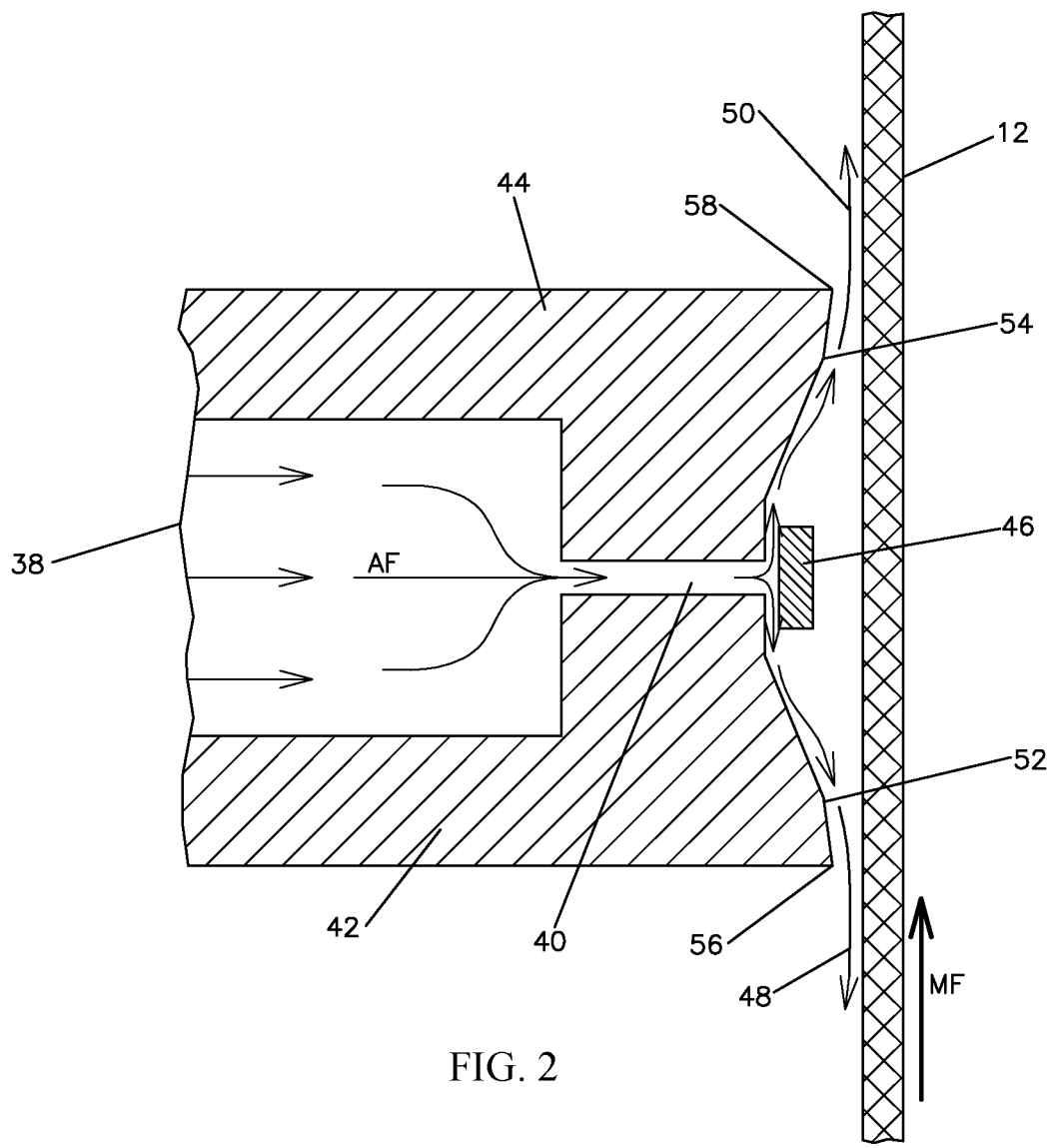
FIG. 2 is a close-up cross sectional view of an exemplary cooling element suitable for use in practicing exemplary embodiments of this disclosure.

FIG. 2 shows a cross sectional view of the inner portion of one half of a divergent cooling element, of the present invention. Each divergent cooling element (FIG. 1, 24*a-c*), is provided with an interior air plenum 38 of any suitable shape and size, that directs the associated supplied cooling gas to flow generally radially inward through annular channel 40 formed between cooling members 42 and 44. Annular channel 40 feeds cooling gas toward cooling gas deflector 46, inwardly supported from cooling members 42 and/or 44 using common, readily available fastening means such as screws and washers, not shown. Cooling gas deflector 46 prevents direct cooling gas flow against molten film tube 12 and separates cooling gas flow into oppositely directed cooling gas streams 48 and 50. Cooling gas stream 48 flows generally opposite the direction of the flow of molten film tube 12, between air foil surface 52 and molten film tube 12. Cooling gas stream 50 flows generally in the same direction of flow of molten film tube 12, between air foil surface 54 and molten film tube 12.

Air foil surfaces 52 and 54 are annularly angled inward toward molten film tube 12, in the direction of respective air flow just prior to terminating at air foil exit tips 56 and 58, where cooling gas streams 48 and 50 leave the influence of air foil surfaces 52 and 54 respectively and flow in cooling contact along the surface of molten film tube 12. Compound angles are preferentially employed along air foil surfaces 52 and 54 with larger angles relative to molten film tube 12 located nearest to cooling gas deflector 46, and smaller angles located adjacent respective air foil exit tips 56 and 58. Importantly, no portion of the divergent cooling element having a divergent cooling interface comprised of cooling gas deflector 46, air foil surfaces 52 and 54, and air foil exit tips 56 and 58 is closer to the molten film tube than either one or both of the air foil exit tips 56 and 58, to ensure that no mechanical contact with molten film tube 12 can occur.

Figure 3:
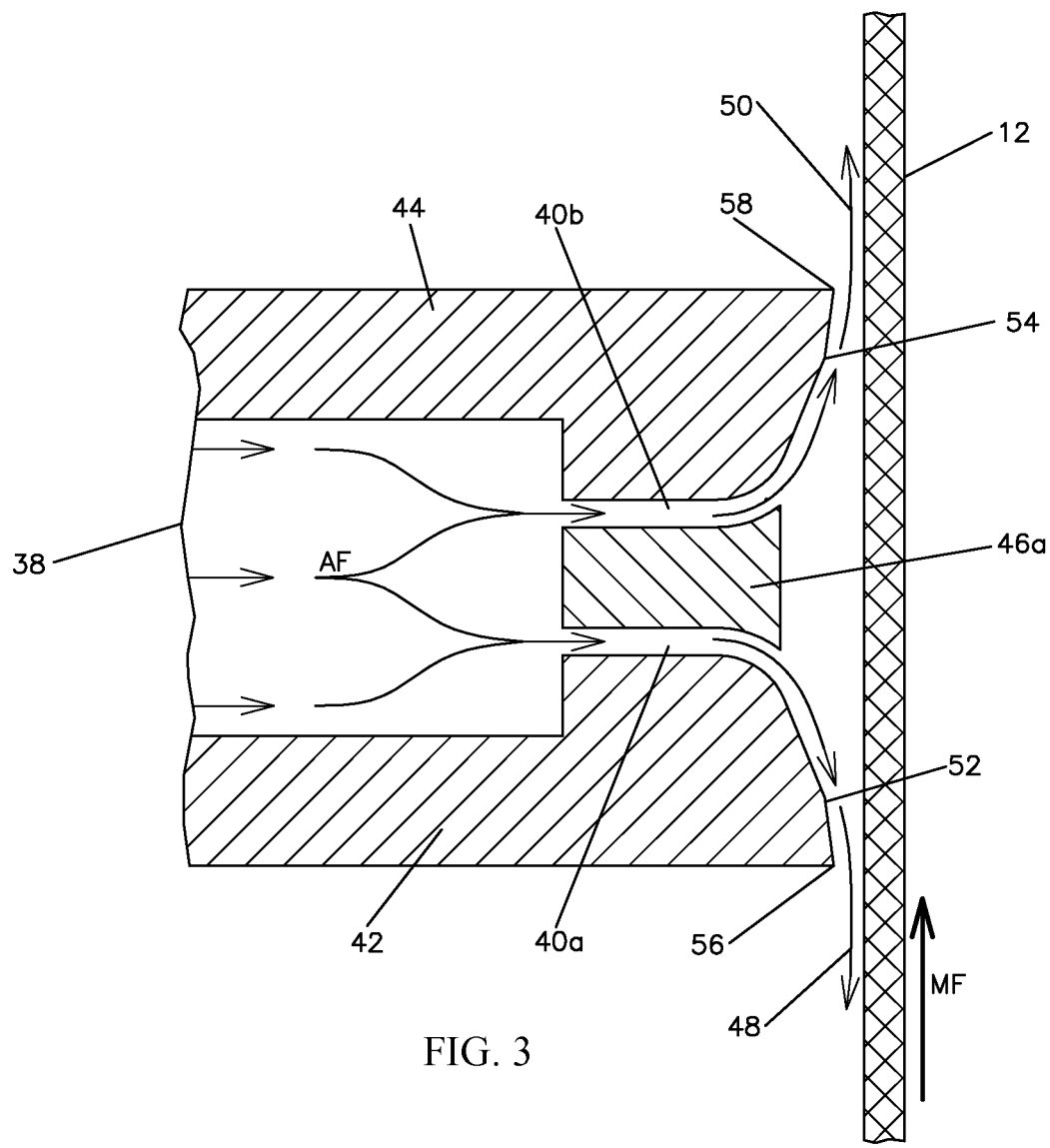
FIG. 3 is a close-up cross sectional view of an alternative exemplary cooling element suitable for use in practicing exemplary embodiments of this disclosure.

In FIG. 3, cooling gas deflector 46 is replaced by cooling gas deflector 46*a* located intermediate cooling members 42 and 44, forming a pair of annular channels 40*a* and 40*b*. Cooling gas from interior air plenum 38 generally flows radially inward, independently through annular channels 40*a* and 40*b*, exiting the influence of cooling gas deflector 46*a* as oppositely directed cooling gas streams 48 and 50, respectively. Cooling gas stream 48 flows generally opposite the direction of flow of molten film tube 12, between air foil surface 52 and molten film tube 12. Cooling gas stream 50 flows generally in the same direction of flow of molten film tube 12, between air foil surface 54 and molten film tube 12.

As described in FIG. 2, air foil surfaces 52 and 54 are annularly angled inward toward molten film tube 12, in the direction of respective air flow just prior to terminating at air foil exit tips 56 and 58, where cooling gas streams 48 and 50 leave the influence of air foil surfaces 52 and 54 respectively and flow in cooling contact along the surface of molten film tube 12. Compound angles are preferentially employed along air foil surfaces 52 and 54 with larger angles relative to molten film tube 12 located nearest to cooling gas deflector 46*a*, and smaller angles located adjacent respective air foil exit tips 56 and 58. Importantly, no portion of the divergent cooling element having a divergent cooling interface comprised of cooling gas deflector 46*a*, air foil surfaces 52 and 54, and air foil exit tips 56 and 58 is closer to the molten film tube than either one or both of the air foil exit tips 56 and 58, to ensure that no mechanical contact with molten film tube 12 can occur.

Figure 4:
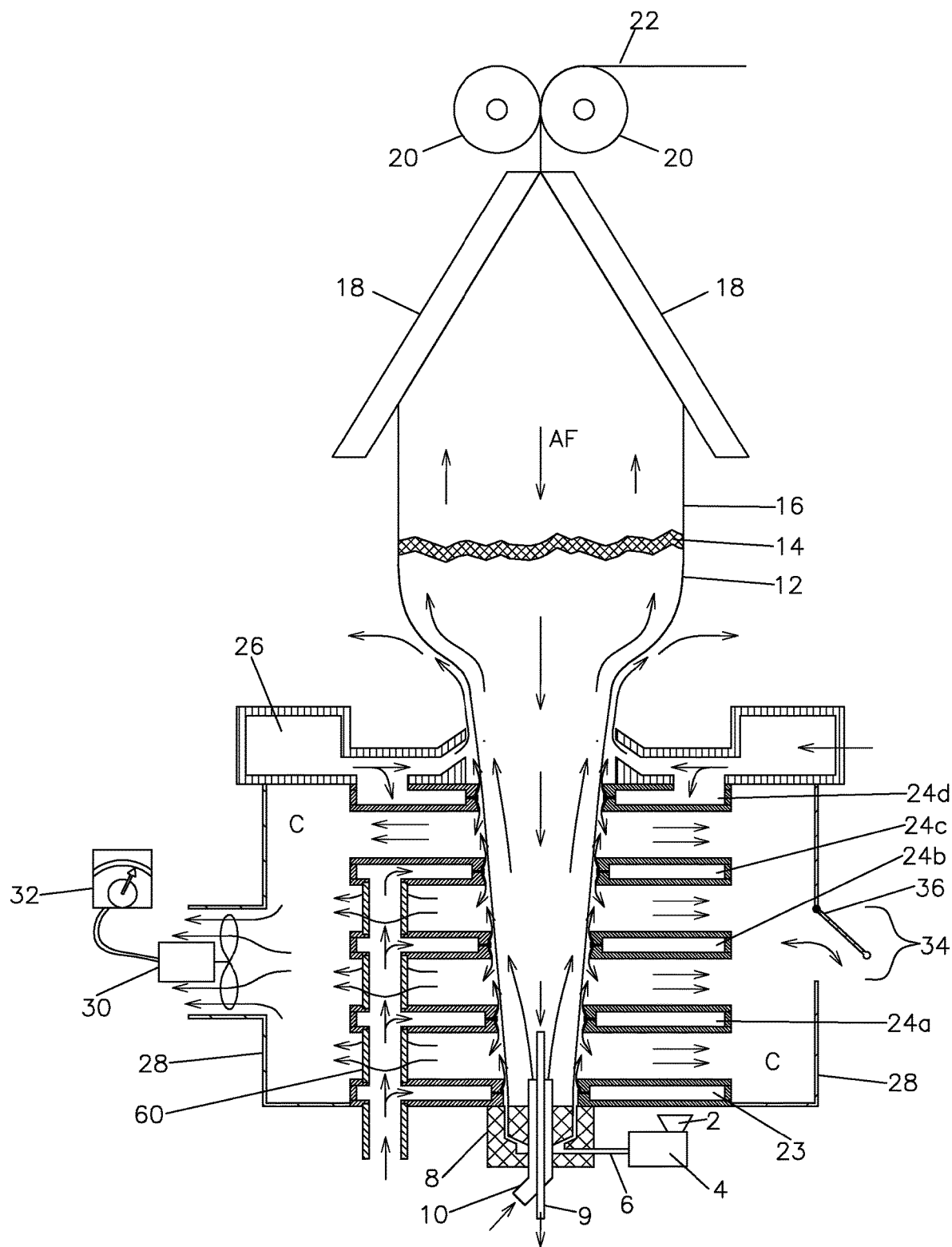
FIG. 4 is a cross sectional view of an alternative device suitable for use in practicing exemplary embodiments of this disclosure.

FIG. 4 depicts a cross section view of a blown film cooling system with high performance, divergent cooling elements and enclosure 28 of the present invention. Enclosure 28 as shown, includes an associated variable exhaust device 30, variable controller means 32, and flow buffer 34 with freely swinging flapper 36 as previously described. Cooling gas supply conduits 60 are also added, spaced generally inside and around the perimeter of cooling elements 23, 24*a*, 24*b* and 24*c*, forming a common supply of cooling gas. Cooling gas supply conduits 60 also act to space apart and locate concentric to molten film tube 12 each of the associated cooling elements 23, 24*a*, 24*b* and 24*c*. Cooling element 24*d* is advantageously shown supplied with cooling gas in common with cooling element 26, forming a high performance triple flow air ring. Cooling element 26 is depicted with one single-flow of cooling gas, but can include more than one flow of cooling gas, forming further high performance multiple-flow versions in combination with cooling element 24*d* of the present invention, exiting to flow unrestricted, generally upward and along molten film tube 12, directly influenced by the surrounding atmosphere, while cooling and allowing for free expansion of molten film tube 12. Cooling element 26 may also be omitted, allowing cooling gas exiting from the upper most located high performance, divergent cooling element to either be located below frost line 14 and allow for free expansion or be located above frost line 14 and constrain the molten film tube 12.

Figure 5:
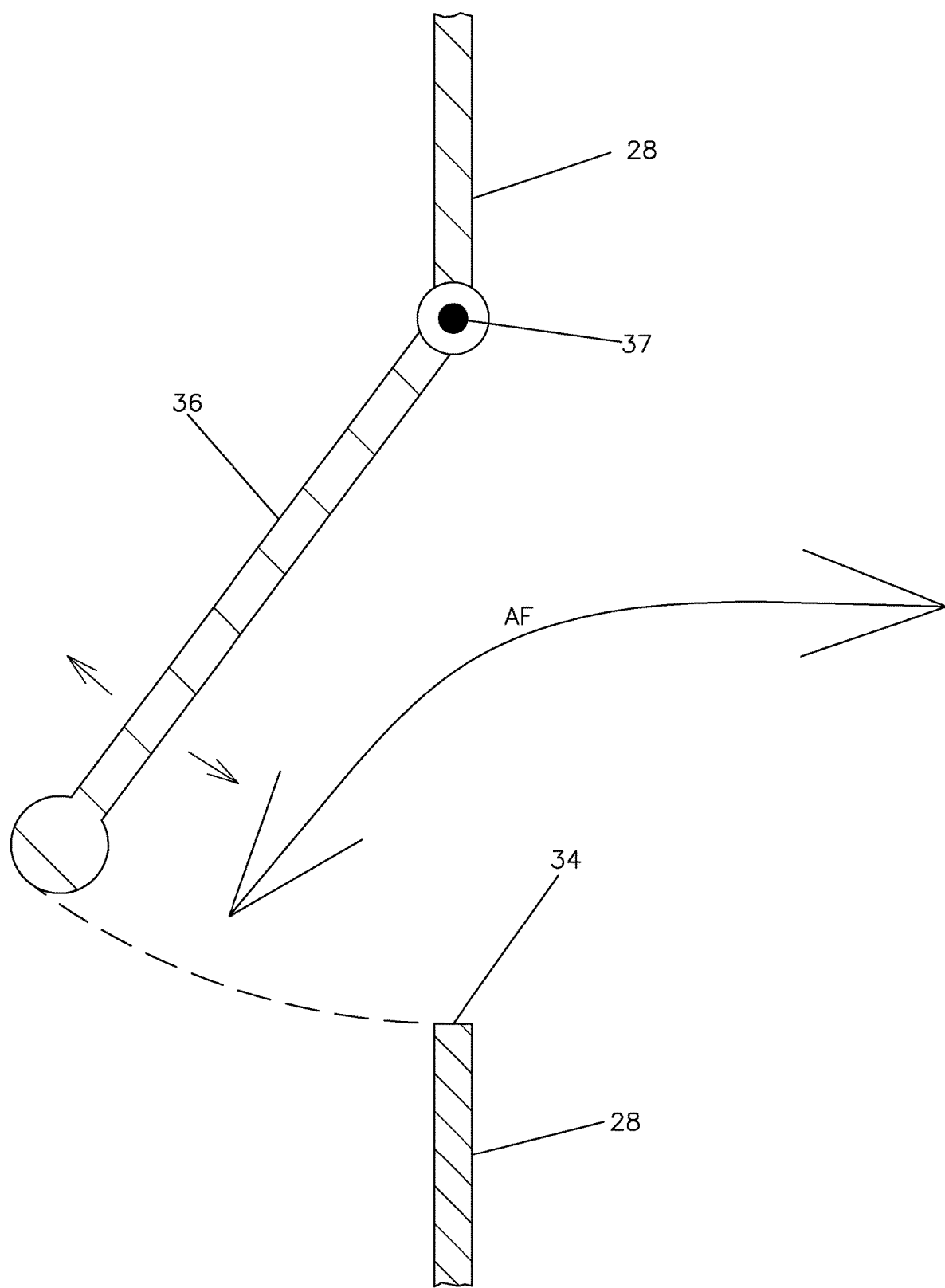
FIG. 5 is a close-up view of an exemplary flow buffer suitable for use in practicing exemplary embodiments of this disclosure.

FIG. 5 shows a magnified partial cross sectional view of enclosure 28 with optional flow buffer 34 including flapper 36. Enclosure 28 is provided with optional flow buffer 34 installed minimally as a passage through the wall of enclosure 28 and includes freely swinging flapper 36 that hangs by gravity generally inside the passage of flow buffer 34 and swings freely about pivot 37. Air is allowed to pass in either direction through flow buffer 34, between the internal portion of enclosure 28 (cavity C) and the surrounding atmosphere, creating an associated pressure differential across flow buffer 34. As air flows in either direction through flow buffer 34, freely swinging flapper 36 rotates about pivot 37 to move under the influence of gravity, in the direction of air flow or to hang straight down under a no flow condition forming a flow dependent variable cross section within flow buffer 34 formed between the passage extents and flapper 36. Pressure regulating characteristics of flow buffer 34 can easily be set by adjusting associated passage geometry and the geometry and weight of freely swinging flapper 36 to achieve very smooth, fast acting pressure regulation of cavity C, contained inside enclosure 28.

Figure 6:
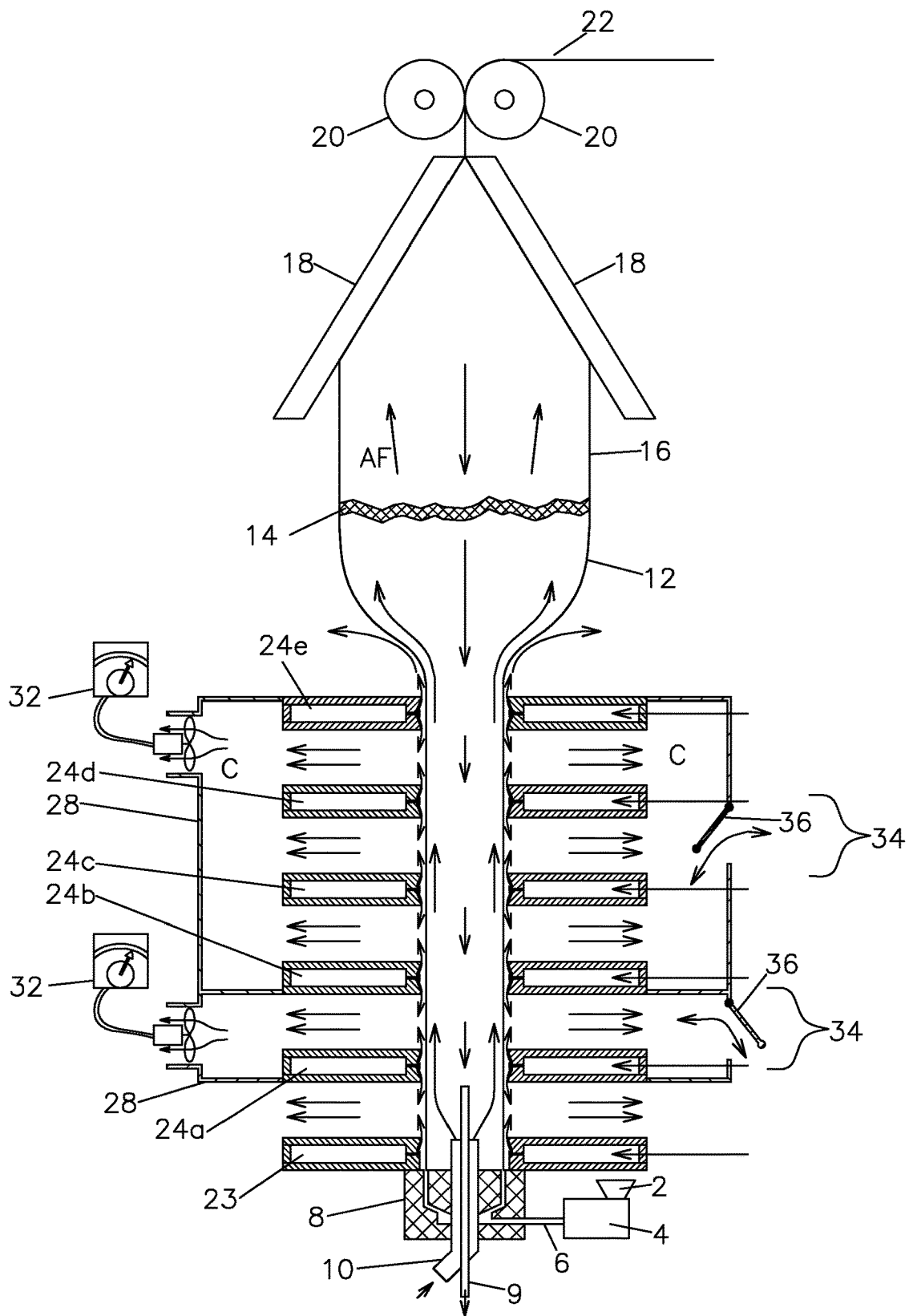
FIG. 6 is a cross sectional view of yet another device suitable for use in practicing exemplary embodiments of this disclosure.

FIG. 6 shows a cross sectional view of a typical blown film extrusion process with a stacked cooling system employing multiple enclosures 28 of the present invention. Each enclosure 28, is adjusted by an associated variable controller means 32 acting on associated variable exhaust device 30, and associated optional flow buffer 34 with associated and further optional freely swinging flapper 36, each acting independently on one or more associated cooling element(s) as previously described. The area between cooling elements 23 and 24a is depicted without an associated enclosure 28, forming an uncontrolled area directly influenced by the surrounding atmosphere, but alternately can be configured with an associated enclosure 28, either directly, or grouped with other cooling elements. Any number of enclosures 28 and uncontrolled areas can be employed in any order, each incorporating any number of cooling elements as divergent cooling elements 24a-e as shown, or other forms of cooling elements, without limit. Additionally, the number of cooling elements present in the stack is not limited and can be as many or as few as desired.

The short stack cooling system depicted, preferentially includes high performance, divergent cooling elements previously described. Cooling gas supply conduits 60, shown in FIG. 4, can advantageously be employed as desired to form a common supply of cooling gas, to space apart and locate concentric to molten film tube 12 each of the associated cooling elements 23, 24a, 24b, 24c, 24d and 24e.

One additional cooling element 24e is depicted within the cooling stack, arranged as the final cooling element in the stacked blown film cooling system. If frost line 14 is disposed to be above cooling element 24e, upward flowing cooling gas from cooling element 24e flows along and allows for free expansion of molten tube 12. Alternatively, if frost line 14 is disposed to be within or below cooling element 24e, upward flowing cooling gas from cooling element 24e flows along the now solidified film tube 16 preventing free expansion, and constraining the molten film tube 12 within the cooling system.

The present invention is presented on an upward blown film extrusion process, but equally applies to horizontal or downward versions of the blown film extrusion process, without limit.

Figure 7:
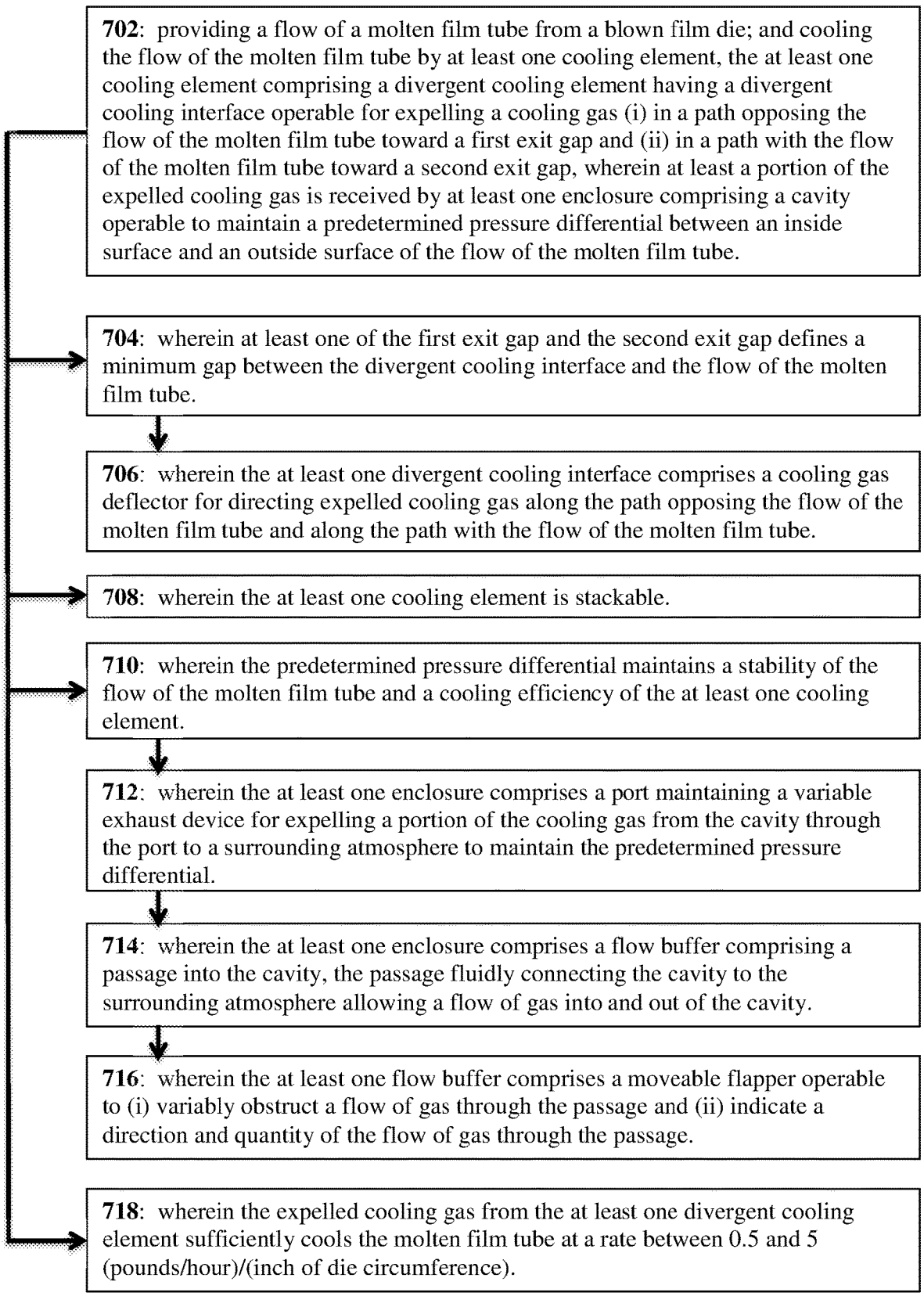
FIG. 7 is a logic flow diagram in accordance with a method and apparatus for performing exemplary embodiments of this disclosure.

Referring to FIG. 7, presented is a logic flow diagram in accordance with a method and apparatus for performing exemplary embodiments of this disclosure. Block 702 presents providing a flow of a molten film tube from a blown film die; and cooling the flow of the molten film tube by at least one cooling element, the at least one cooling element comprising a divergent cooling element having a divergent cooling interface operable for expelling a cooling gas (i) in a path opposing the flow of the molten film tube toward a first exit gap and (ii) in a path with the flow of the molten film tube toward a second exit gap, wherein at least a portion of the expelled cooling gas is received by at least one enclosure comprising a cavity operable to maintain a predetermined pressure differential between an inside surface and an outside surface of the flow of the molten film tube. Then Block 704 relates to wherein at least one of the first exit gap and the second exit gap defines a minimum gap between the divergent cooling interface and the flow of the molten film tube.

Block 706 then states wherein the at least one divergent cooling interface comprises a cooling gas deflector for directing expelled cooling gas along the path opposing the flow of the molten film tube and along the path with the flow of the molten film tube. Block 708 indicates wherein the at least one cooling element is stackable. Block 710 specifies wherein the predetermined pressure differential maintains a stability of the flow of the molten film tube and a cooling efficiency of the at least one cooling element. Block 712 states wherein the at least one enclosure comprises a port maintaining a variable exhaust device for expelling a portion of the cooling gas from the cavity through the port to a surrounding atmosphere to maintain the predetermined pressure differential.

Then block 714 relates to wherein the at least one enclosure comprises a flow buffer comprising a passage into the cavity, the passage fluidly connecting the cavity to the surrounding atmosphere allowing a flow of gas into and out of the cavity. Block 716 then states wherein the at least one flow buffer comprises a moveable flapper operable to (i) variably obstruct a flow of gas through the passage and (ii) indicate a direction and quantity of the flow of gas through the passage. Finally, block 718 states wherein the expelled cooling gas from the at least one divergent cooling element sufficiently cools the molten film tube at a rate between 0.5 and 5 (pounds/hour)/(inch of die circumference).

The logic flow diagram may be considered to illustrate the operation of a method. The logic flow diagram may also be considered a specific manner in which components of a device are configured to cause that device to operate, whether such a device is a blown film tubular extrusion device, controlled pressure enclosure, or divergent cooling element, or one or more components thereof.

In an alternative exemplary embodiment, the apparatus includes at least a first cooling element and a second cooling element (e.g., as set forth in FIGS. 1-4, 8, and 9). The first and the second cooling elements are stacked coaxially adjacent and spaced apart from one another such that a first flow of cooling gas emanates from the first cooling element in a path with the flow of the molten film tube. A second flow of cooling gas emanates from the second cooling element in a path opposite the flow of the molten film tube, such that the two flows of cooling gas are directed to flow against one another, between the first and second cooling elements along the surface of the molten film tube. This embodiment includes one or more stabilizer ring(s) associated with each of the first and second flows of cooling gas. Each stabilizer ring is stacked coaxially adjacent and spaced apart from the cooling elements such that at least a portion of the flow of cooling gas from each of the cooling elements flows between the associated stabilizer ring and the molten film tube. The surface of each stabilizer ring facing the molten film tube can be planar, curved, convex, or concave. The surface of each stabilizer ring facing the molten film tube can also be either converging toward the molten film tube in the direction of flow of cooling gas (shown in FIG. 8 on stabilizer ring 59 and stabilizer ring 57), or diverging away from the molten film tube. Embodiments provide that adjacent cooling element and stabilizer ring(s) are not in contact with one another, thereby allowing cooling gas to flow around the surfaces of each stabilizer ring. In other words, gaps are formed between adjacent cooling element and stabilizer rings to allow cooling gas to flow as required to relieve unbalanced and/or unstable forces acting on the molten film tube. This alternative embodiment provides improved output rate of blown molten film tube, improved film holding forces to maintain the stability of the molten film tube, and easier/wider range of adjustment to optimize performance of molten film output rates, without the presence of high noise levels or detrimental vibration of the molten film tube, flutter of the molten film tube, and drag. Further, embodiments of the present disclosure provide that increased spacing is allowed between cooling elements resulting fewer cooling elements to obtain similar output rates.

Figure 8:
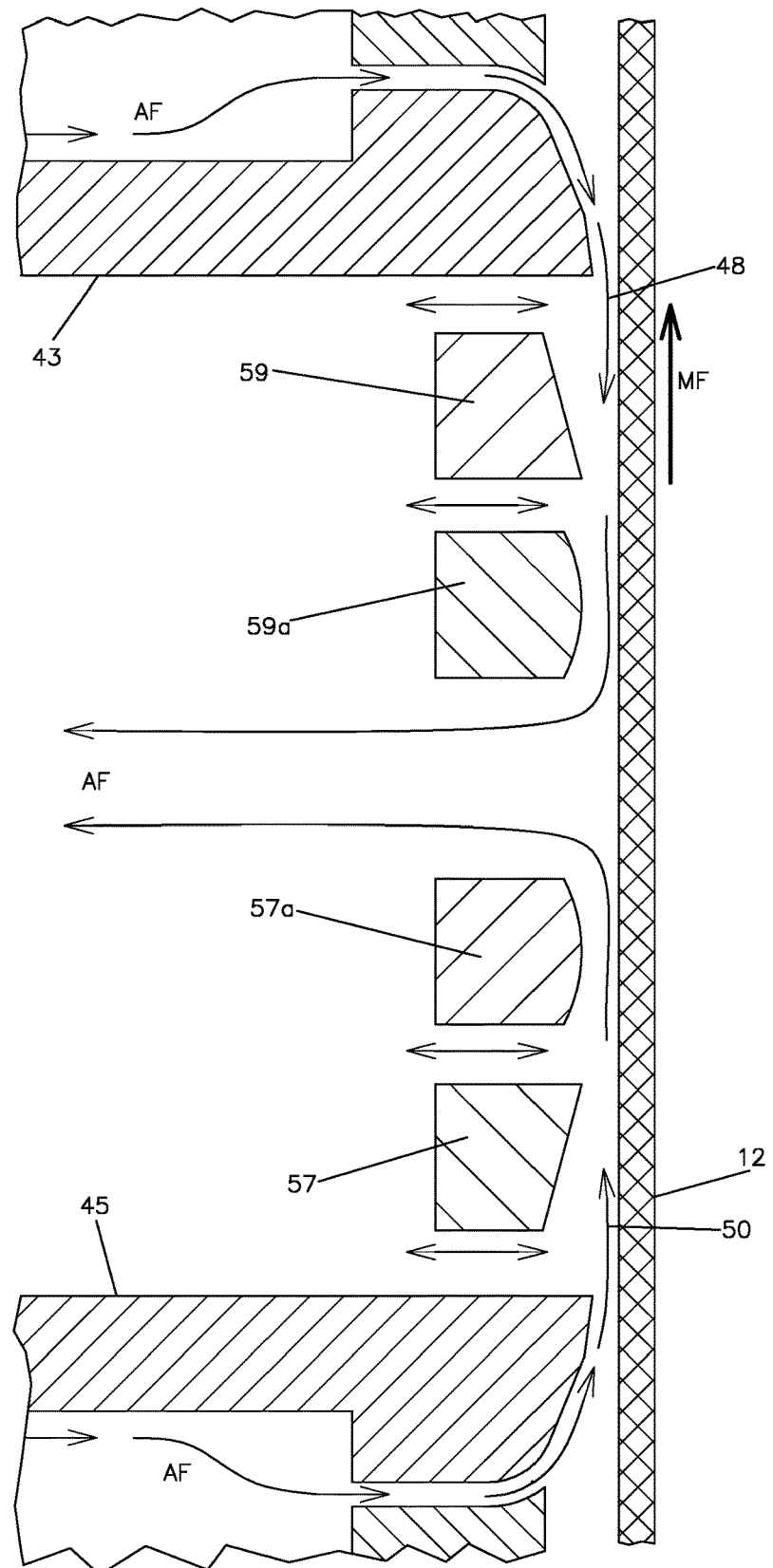
FIG. 8 is a close-up cross sectional view of the inner portion of one half of a pair of cooling elements suitable for use in practicing alternate exemplary embodiments of this disclosure.
Figure 9:
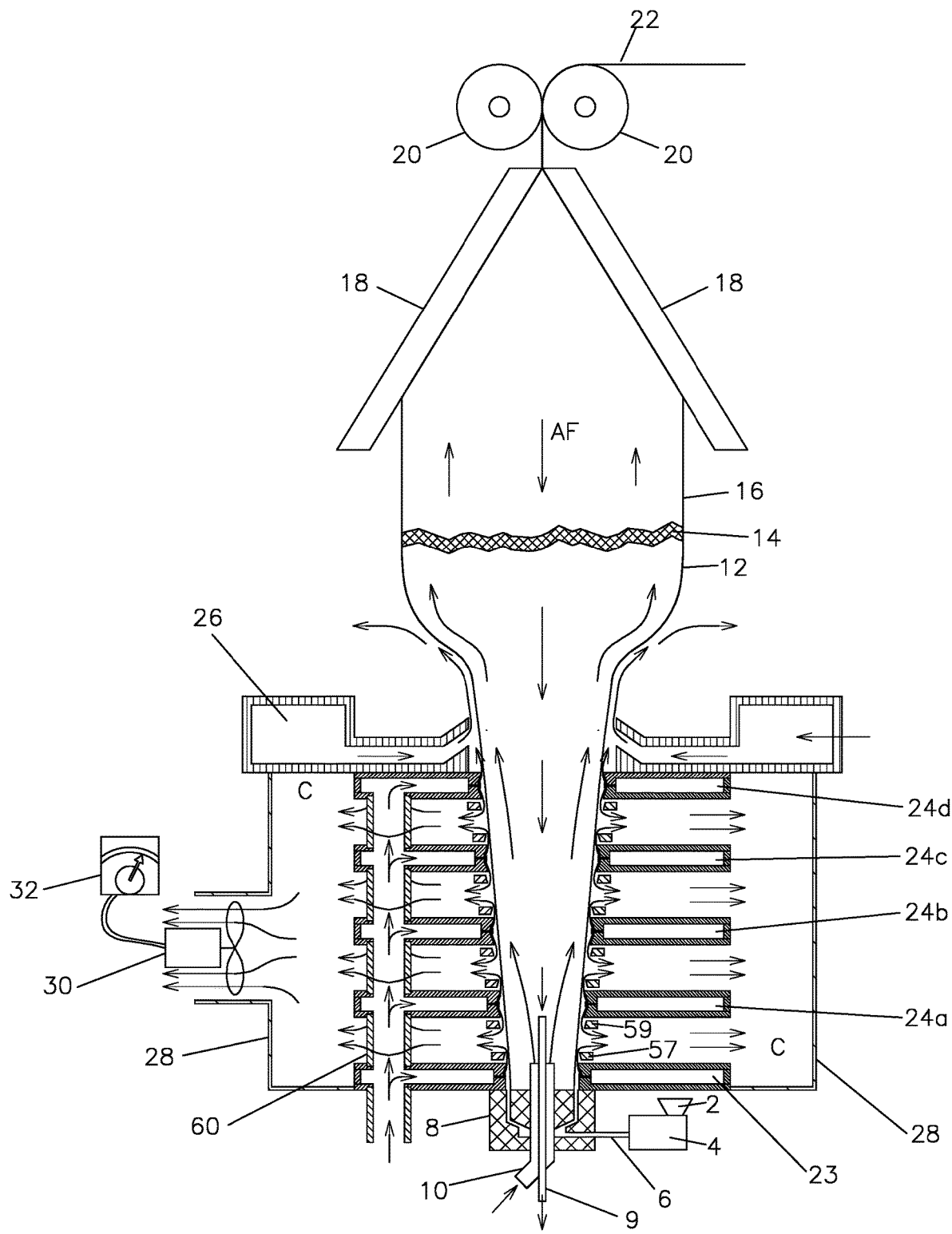
FIG. 9 is a cross sectional view of a device suitable for use in practicing alternate exemplary embodiments of this disclosure.

Referring to FIG. 8, shown is a close-up cross sectional view of the inner portion of one half of a pair of cooling elements 23 and 24*a* (as shown and described in FIGS. 1-6) operable to expel cooling gas from each cooling element directed to flow against one another. Alternatively, pairs of cooling elements can equally be cooling elements 24*a* and 24*b*, 24*b* and 24*c*, 24*c* and 24*d*, or 24*d* and 24*e*. In FIG. 8 and FIG. 9 (as in FIG. 1-FIG. 6), all thin arrows indicating a direction are for illustrative purposes only, labeled for example as AF, and indicate a direction of flow of a fluid (e.g. cooling gas). Further, Thick arrows indicating a direction are for illustrative purposes only, labeled for example as MF, and indicate a direction of flow of a plastic film material (e.g. molten film tube). Cooling gas stream 50 flows in a path with the flow of the molten film tube and cooling gas stream 48 flows in a path opposite the flow of the molten film tube. Using commonly available spacers and fasteners such as screws and washers, stabilizer ring 57 is spaced apart from the cooling element top surface 45 to allow cooling gas communication around the surfaces of stabilizer ring 57, and positioned to allow at least a portion of cooling gas stream 50 to flow between stabilizer ring 57 and molten film tube 12. Similarly held in position, stabilizer ring 59 is spaced apart from the cooling element bottom surface 43 to allow cooling gas communication around the surfaces of stabilizer ring 59, and positioned to allow at least a portion of cooling gas stream 48 to flow between stabilizer ring 59 and molten film tube 12. Stabilizer rings 57 and 59 are also spaced apart from one another defining a gap or space allowing for a flow of cooling gas between stabilizer rings 57 and 59. Stabilizer rings 57 and 59 are shown in FIG. 8 as generally planar and angled to direct a flow of cooling gas from for example cooling elements 23 and 24*a*, respectively, to converge toward the molten film tube 12 in the direction of flow of the associated cooling gas. It should be appreciated that embodiments of stabilizer rings 57 and 59 include a molten film facing surface that is angled away from (or divergent from) the molten film tube. Embodiments of the stabilizer rings 57 and 59 also include convex or concave molten film tube 12 facing surfaces. It should be appreciated that while stabilizer rings 57 and 59 have been described as separate elements, embodiments include instances wherein stabilizer ring 57 and stabilizer ring 59 are coupled to one another provided that there are still spaces or gaps there between to allow a flow of cooling gas (i) between stabilizer rings 57, 59 and molten film tube 12, and (ii) between stabilizer ring 57 and stabilizer ring 59.

Optionally, additional stabilizer rings 57*a* and 59*a* can be added spaced apart from stabilizer rings 57 and 59, respectively. Stabilizer rings 57*a* and 59*a* are shown in FIG. 8 with convex flow surfaces (i.e., molten film facing surfaces), however, embodiments of stabilizer rings 57*a* and 59*a* also include molten film tube 12 facing surfaces that are angled to converge or diverge toward the molten film tube 12 in the direction of flow of the associated cooling gas, or have concave flow surfaces. It should be understood that any number of stabilizer rings can be added between adjacent cooling elements to achieve the desired performance, provided a gap is formed between adjacent stabilizer rings. Cooling gas flows either toward the molten film tube or away from the molten film tube 12 through the gaps formed between adjacent cooling element top surface 45, cooling element bottom surface 43, stabilizer rings 57 and 59, and optional stabilizer rings 57*a* and 59*a*, to flow in either direction as required to relieve any unbalanced and/or unstable forces acting on molten film tube 12. A remaining portion of cooling gas stream 50 collides with a remaining portion of cooling gas stream 48 between stabilizer rings 57 and 59 (or optional stabilizer rings 57*a* and 59*a*, or further optionally added stabilizer rings) and exhausts outward between associated cooling elements and/or stabilizing rings.

FIG. 9 shows a cross sectional view of a typical blown film extrusion process employing an enclosure 28 and short stack cooling system employing divergent cooling elements similar to FIG. 4 but with stabilizer rings of the present embodiment. Unlike FIG. 4, variable exhaust device 30 is shown in a simplified arrangement without optional flow buffer 34 and associated flapper 35, and an additional cooling gas supply conduit 60 separately provides for cooling gas flow to cooling element 24*d*, but otherwise remains in contact with cooling element 26. Individual stabilizer rings 57 and 59 are located between cooling elements 23 and 24*a*, between cooling elements 24*a* and 24*b*, between cooling elements 24*b* and 24*c*, and between cooling elements 24*c* and 24*d*. Optional stabilizer rings 57*a* and 59*a* are not shown, but can be added as desired to enhance system performance relative to stabilizer rings 57 and 59 as shown in FIG. 8. While FIG. 9 depicts the presence of enclosure 28, variable exhaust device 30, and variable controller means 32, embodiments include the absence of these elements provided that stabilizer rings 57 and 59 (and optional stabilizer rings 57*a* and 59*a*, if added) are present in the system.

Referring to FIG. 10, presented is an exemplary logic flow diagram in accordance with an alternative method and apparatus for performing exemplary embodiments of this disclosure. Block 1002 presents providing a flow of a molten film tube from a blown film die; (b) cooling the flow of the molten film tube by a first cooling element and a spaced apart second cooling element, the first cooling element and the second cooling element each comprising a divergent cooling element having a divergent cooling interface operable for expelling a cooling gas (i) in a path opposing the flow of the molten film tube toward a first exit gap and (ii) in a path with the flow of the molten film tube toward a second exit gap; and (c) receiving the flow of the molten film tube by a first stabilizer ring and a second stabilizer ring, the first stabilizer ring and the second stabilizer ring each operably stacked between the first cooling element and the second cooling element. Block 1004 relates to wherein the first stabilizer ring and the second stabilizer ring are each sufficiently spaced from the molten film tube to allow a flow of expelled cooling gas between the first and the second stabilizing rings and the molten film tube.

Following block 1004, block 1006 states wherein the first stabilizer ring is spaced from the first cooling element to allow a flow of expelled cooling gas between the first cooling element and the first stabilizer ring, and wherein the second stabilizer ring is spaced from the second cooling element to allow a flow of expelled cooling gas between the second cooling element and the second stabilizer ring. Then block 1008 indicates the method further comprising receiving the flow of molten film tube by a spaced apart third stabilizer ring and a spaced apart fourth stabilizer ring, each operably stacked between the first and the second cooling elements. Finally, block 1010 further states wherein the first stabilizer ring, the second stabilizer ring, the third stabilizer ring, the fourth stabilizer ring, the first cooling element, and the second cooling element are each spaced from one another to allow a flow of expelled cooling gas there between.

The logic flow diagram shown in FIG. 10 may be considered to illustrate the operation of a method. The logic flow diagram may also be considered a specific manner in which components of a device are configured to cause that device to operate, whether such a device is a blown film tubular extrusion device, controlled pressure enclosure, or unidirectional cooling element, or one or more components thereof.

Figure 11:
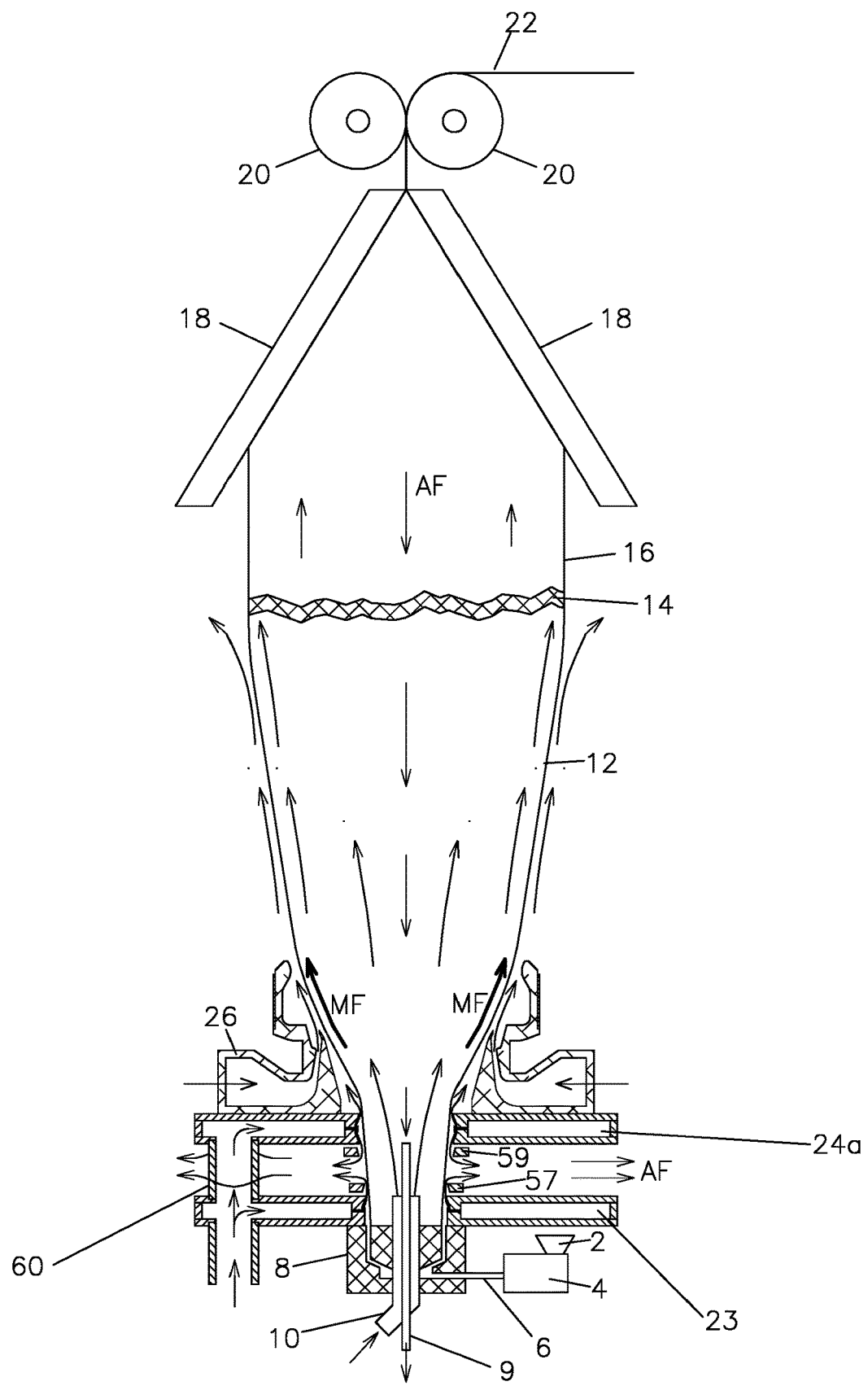
FIG. 11 is a cross sectional view of yet another device suitable for use in practicing exemplary embodiments of this disclosure.
Figure 12:
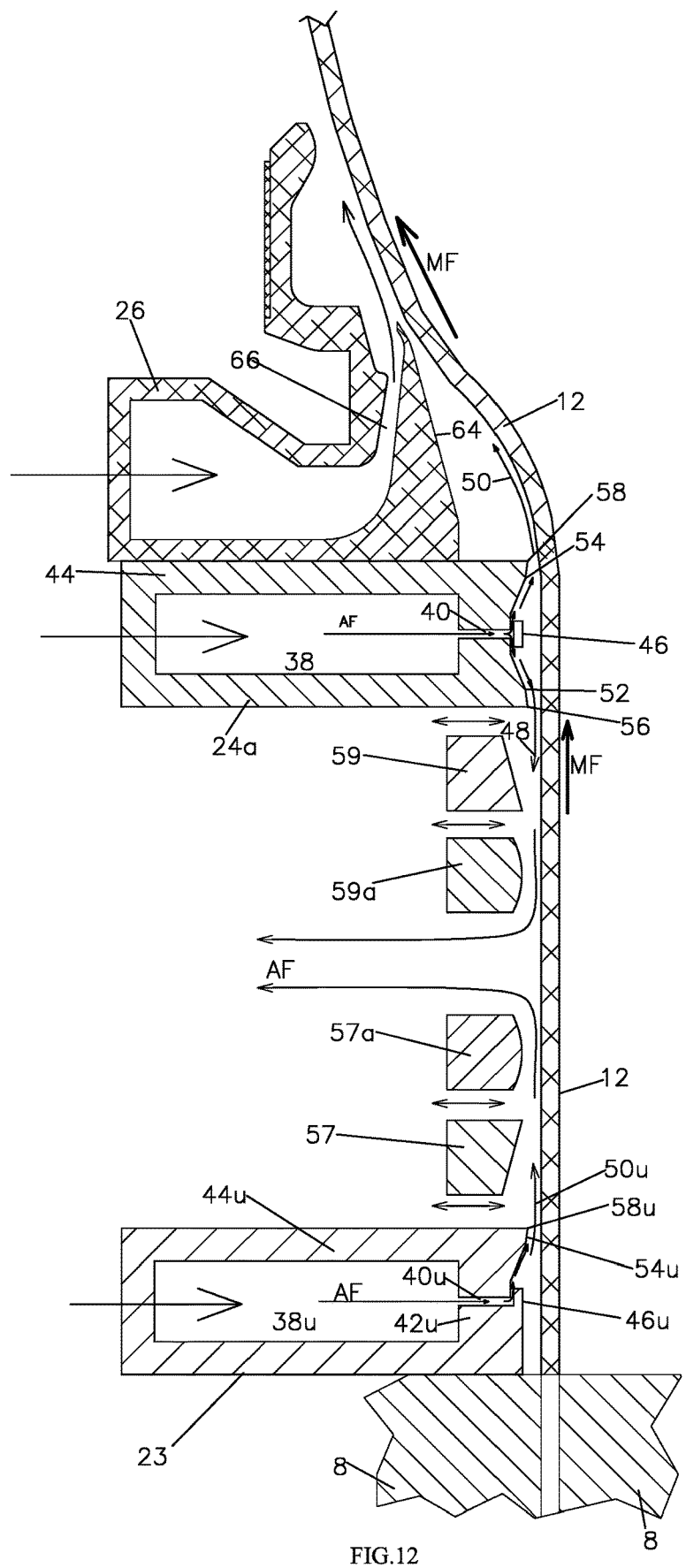
FIG. 12 is a close-up cross sectional view of one half of a device suitable for use in practicing exemplary embodiments of this disclosure.
Figure 13:
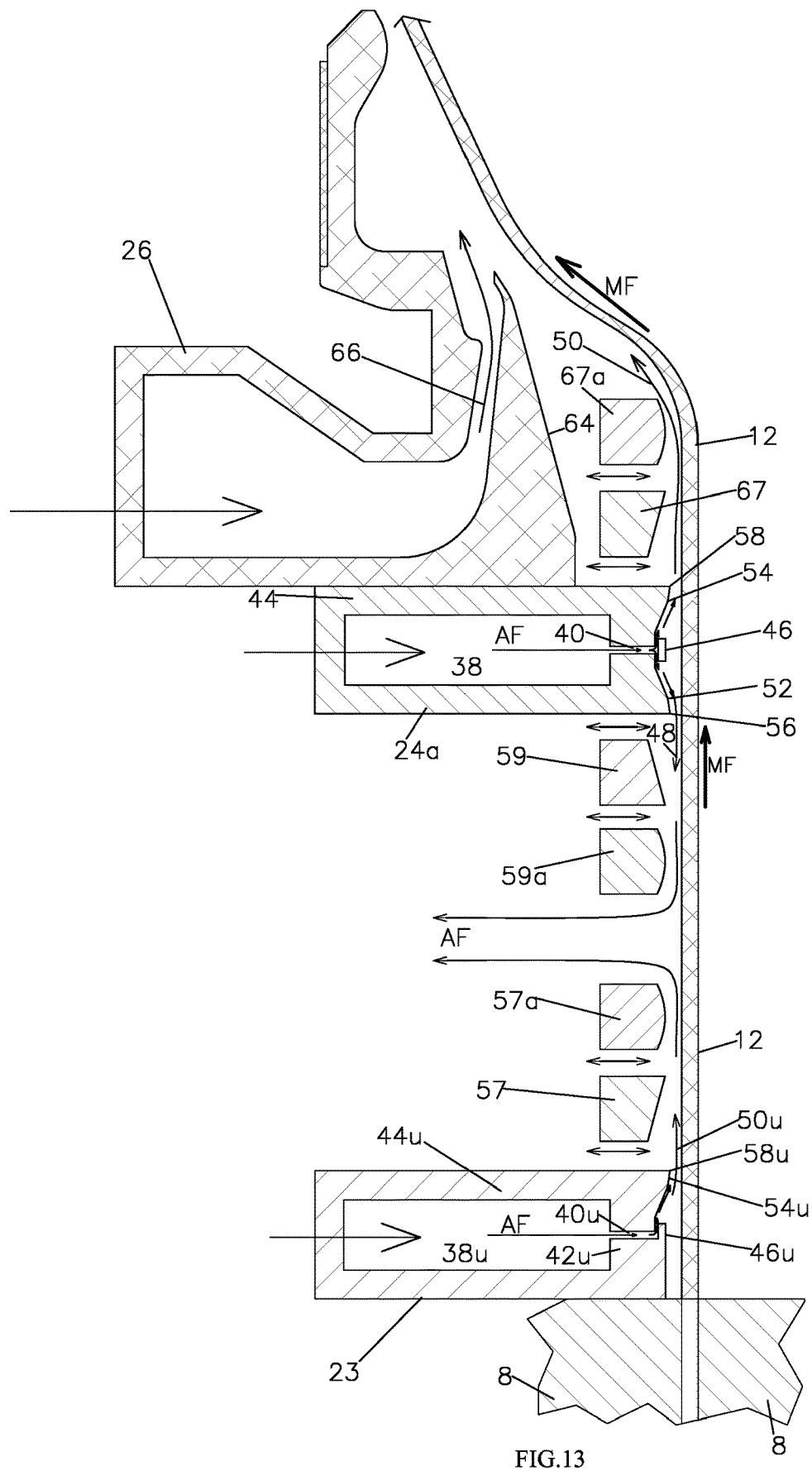
FIG. 13 is a close-up cross sectional view of one half of another embodiment of a device suitable for use in practicing alternate exemplary embodiments of this disclosure.

FIG. 11 shows a cross sectional view of a blown film extrusion process employing a short stack cooling system with cooling element 26 stacked above cooling element 24a. Also shown is cooling element 24a stacked above and spaced apart from cooling element 23. Cooling element 23 is adjacent die means 8, and similar to FIG. 9, stabilizer rings 57 and 59 are located between cooling elements 23 and 24a. In FIG. 11-FIG. 13 (as in FIG. 1-FIG. 10), all thin arrows indicating a direction are for illustrative purposes only, labeled for example as AF, and indicate a direction of flow of a fluid (e.g. cooling gas). Further, Thick arrows indicating a direction are for illustrative purposes only, labeled for example as MF, and indicate a direction of flow of a plastic film material (e.g. molten film tube). Cooling gas supply conduit 60 optionally provides cooling gas to cooling elements 23 and 24a from a common source, and cooling element 26 is provided with a separate source of cooling gas. Alternately, cooling elements 23, 24a and 26 can be supplied with cooling gas flow from a single source or supplied in any combination including from individual sources of cooling gas. Further, cooling element 26 is optionally shown as single flow air ring having an air ring cooling interface 64 of a dual flow air ring with the first annular gap removed. However, it should be appreciated that cooling element 26 can be any of a single flow, dual flow, triple flow, and multiple flow air ring. Additionally, enclosure 28, variable exhaust device 30, and variable controller means 32 (collectively shown in FIGS. 1, 4, and 6) may optionally be employed with this embodiment.

Referring to FIG. 12, shown is a close-up cross sectional view of one half of the apparatus described in FIG. 11. Cooling element 23 is a unidirectional cooling element having a unidirectional cooling interface comprised of cooling gas deflector 46u, air foil surface 54u, and air foil exit tip 58u, and further containing an interior air plenum 38u of any suitable shape and size, that directs the associated supplied cooling gas toward the unidirectional cooling interface to flow generally radially inward through annular channel 40u formed between cooling members 42u and 44u. Cooling gas deflector 46u is formed in one embodiment as an extension of cooling member 42u. Cooling gas deflector 46u prevents a flow of cooling gas from contacting molten film tube 12 at substantially perpendicular angles, but rather directs cooling gas stream 50u to flow generally in the same direction of flow of molten film tube 12, between the unidirectional cooling interface and molten film tube 12. Cooling gas deflector 46u as depicted, is rectangular shaped, however, it should be appreciated that embodiments of cooling gas deflector 46u includes any shape (e.g., triangular or curved) that operably redirects cooling gas toward air foil surface 54u in the path of the flow of molten film tube 12.

Air foil surface 54u is annularly angled inward toward molten film tube 12, in the direction of cooling gas flow just prior to terminating at air foil exit tip 58u, where the cooling gas stream 50u leaves the influence of air foil surface 54u and continues to flow in cooling contact along the surface of molten film tube 12. As shown in FIG. 2 and FIG. 3, compound angles are employed along air foil surface 54u with larger angles relative to molten film tube 12 located nearest to cooling gas deflector 46u, and smaller angles located adjacent respective air foil exit tip 58u. It should be appreciated that embodiments of air foil surface 54u need not include compound angles, but can include an angled or curved surface relative to molten film tube 12 provided that a minimum gap between air foil surface 54u and the surface of molten film tube 12 is located at air foil exit tip 58u. No portion of cooling element 23 having a unidirectional cooling interface comprised of cooling gas deflector 46u, air foil surface 54u, and air foil exit tip 58u is closer to the molten film tube than air foil exit tip 58u. To ensure that no mechanical contact with molten film tube 12 can occur, it is important to arrange all portions of cooling gas deflector 46u, radially spaced outwardly from the exit point of die means 8, where the annular molten flow exiting die means 8 forms molten film tube 12. Cooling element 23 is typically located directly adjacent to die means 8, substantially preventing air exchange with surrounding atmosphere between die means 8. Cooling element 23's position relative to die means 8 in combination with the flow of cooling gas exiting from the annular channel 40u to the unidirectional cooling interface of cooling element 23 enables vacuum forces to operably act on the flow of the molten film tube 12 urging the flow of the molten film tube 12 into close proximity with air foil exit tip 58u. In some embodiments the proximity distance between the flow of the molten film tube 12 and air foil exit tip 58u is less than about ¼ inch. As depicted in FIG. 11 and FIG. 12, cooling element 24a is a divergent cooling element which operates as described above in reference to FIG. 2 and FIG. 3. Stabilizer rings 57, 59, 57a and 59a, located intermediate cooling element 23 and 24a, operate as described in reference to FIG. 8 above.

Cooling element 26 operates as described in reference to FIG. 4 above, and is one of a single flow, dual flow, triple flow, and multiple flow air ring with an air ring cooling interface 64 having an associated single flow, dual flow, triple flow, and multiple flow air foil respectively, operable to provide one or more flows of cooling gas in the path with the direction of the flow of the molten film tube 12. As shown in FIG. 11 and FIG. 12, cooling element 26 is a dual flow air ring with the first (or bottom) annular gap removed. Cooling element 26 is operable to expel cooling gas through annular channel 66 generally upward and in the path of the flow of molten film tube 12. The expelled cooling gas from cooling element 26 is generally allowed to flow and be directly influenced by the surrounding atmosphere after being expelled. After receiving cooling gas from cooling element 26, molten film tube 12 is allowed to freely expand above cooling element 26. Cooling element 26 expels cooling gas through annular channel 66, and is depicted with an air ring cooling interface 64 in the form of a dual flow air ring with the first annular gap removed, wherein the removed first annular gap is replaced by cooling element 24a. As illustrated in FIG. 12, cooling element 24a is in contact with cooling element 26 such that a flow of cooling gas between cooling element 24a and cooling element 26 is substantially prevented. In another embodiment, cooling element 24a can be spaced from cooling element 26 such that expelled cooling gas can pass therebetween.

Referring to FIG. 13, shown is a close-up cross sectional view of one half of the apparatus described in FIG. 11 with operation similar to FIG. 12, wherein stabilizer ring 67 is added adjacent to cooling element 24a in the direction of flow of the molten film tube 12 operable to stabilize the flow of the molten film tube 12 as the flow of the molten film tube enters cooling element 26. One or more additional stabilizer ring(s) 67a may be optionally added to further stabilize the flow of the molten film tube 12 as the flow of the molten film tube 12 enters air ring cooling interface 64. Embodiments of stabilizer rings 67 and 67a are spaced from air ring cooling interface 64 such that expelled cooling gas is allowed to flow between (1) stabilizer rings 67, 67a and the flow of molten film tube 12, and (2) between stabilizer rings 67, 67a and air ring cooling interface 64. It should also be appreciated that stabilizer ring 67 is spaced from a top of cooling element 24a thereby allowing a flow of expelled cooling gas between the top of cooling element 24a and stabilizer ring 67. It should further be appreciated that an enclosure 28, variable exhaust device 30, and variable controller means 32 (shown in FIGS. 1, 4, 5, 6, and 9) may be employed with the embodiments shown in FIGS. 11-13. Embodiments of the present invention allow any number of divergent cooling elements 24 and stabilizer rings 57, 59, 57a and 59a to be added between unidirectional cooling element 23 and divergent cooling element 24a.

Embodiments of the present invention have been described in detail with particular reference to particular embodiments, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

The invention claimed is:

1. An apparatus for cooling, the apparatus comprising:
   (a) a blown film die operable for producing a flow of a molten film tube;
   (b) the flow of the molten film tube;
   (c) a unidirectional cooling element for receiving the flow of the molten film tube, the unidirectional cooling element having a unidirectional cooling interface operable for expelling a cooling gas in a path with the flow of the molten film tube toward a first exit gap, the first exit gap defined by the flow of the molten film tube and an exit tip, wherein the exit tip is angled toward the molten film tube and is closer to the flow of the molten film tube than any other portion of the unidirectional cooling interface;
   (d) a divergent cooling element for receiving the flow of the molten film tube operably stacked adjacent the unidirectional cooling element, the divergent cooling element having a divergent cooling interface operable for expelling a cooling gas (i) in a path opposing the flow of the molten film tube toward a second exit gap and (ii) in a path with the flow of the molten film tube toward a third exit gap;
   (e) one of a single flow air ring, a dual flow air ring, a triple flow air ring, and a multiple flow air ring having an air ring cooling interface adjacent the divergent cooling element, operable to expel cooling gas in the path with the flow of the molten film tube; and
   (f) at least one stabilizer ring stacked adjacent to the divergent cooling element between the air ring cooling interface and the flow of the molten film tube, the at least one stabilizer ring operable to stabilize the flow of the molten film tube as the flow of the molten film tube enters the air ring cooling interface, wherein the at least one stabilizer ring is operably spaced from the air ring cooling interface allowing at least a portion of the expelled cooling gas to flow there between.

2. The apparatus according to claim 1, the apparatus further comprising a first stabilizer ring operably stacked adjacent the unidirectional cooling element between the unidirectional cooling element and the divergent cooling element, and a second stabilizer ring operably stacked adjacent the divergent cooling element between the first stabilizer ring and the divergent cooling element.

3. The apparatus according to claim 2, wherein the first stabilizer ring and the second stabilizer ring is sufficiently spaced from the molten film tube to allow a flow of expelled cooling gas between the first and the second stabilizer rings and the molten film tube.

4. The apparatus according to claim 3, wherein the first stabilizer ring is spaced from the unidirectional cooling element and the second stabilizer ring is spaced from the divergent cooling element to allow a flow of expelled cooling gas between (i) the unidirectional cooling element and the first stabilizer ring, and (ii) the divergent cooling element and the second stabilizer ring.

5. The apparatus according to claim 2, the apparatus further comprising a spaced apart third stabilizer ring and a spaced apart fourth stabilizer ring, each operably stacked between the unidirectional and the divergent cooling element.

6. The apparatus according to claim 5, wherein the first stabilizer ring, the second stabilizer ring, the third stabilizer ring, the fourth stabilizer ring, the unidirectional cooling element, and the divergent cooling element are each spaced from one another to allow a flow of expelled cooling gas there between.

7. The apparatus according to claim 1, wherein the first exit gap defines a minimum gap between the unidirectional cooling interface and the flow of the molten film tube, and wherein the second and third exit gaps define a minimum gap between the divergent cooling interface and the flow of the molten film tube.

8. The apparatus according to claim 1, wherein the divergent cooling element is in contact with the one of a single flow air ring, a dual flow air ring, a triple flow air ring, and a multiple flow air ring, substantially preventing gas exchange with the surrounding atmosphere between the divergent cooling element and the one of a single flow air ring, a dual flow air ring, a triple flow air ring, and a multiple flow air ring.

9. The apparatus according to claim 1, wherein a space is defined between the one of a single flow air ring, a dual flow air ring, a triple flow air ring, and a multiple flow air ring and the divergent cooling element to allow gas exchange with a surrounding atmosphere.

10. The apparatus according to claim 1, wherein the single flow air ring is a dual flow air ring with a first annual gap removed.

11. The apparatus according to claim 1, the apparatus further comprising at least one additional divergent cooling element stacked intermediate the unidirectional cooling element and the divergent cooling element coaxial with the flow of the molten film tube.

12. The apparatus according to claim 11, the apparatus further comprising at least two stabilizer rings intermediate adjacent cooling elements, the at least two stabilizer rings operable to stabilize the flow of the molten film tube between the adjacent cooling elements.

13. The apparatus according to claim 1, the apparatus further comprising at least one enclosure comprising a cavity for receiving at least a portion of the expelled cooling gas, the at least one enclosure operable to maintain a predetermined pressure differential between an inside surface and outside surface of the flow of the molten film tube, wherein the unidirectional cooling element and the divergent cooling element are maintained within the cavity.

14. An apparatus for cooling, the apparatus comprising:
(a) a flow of a molten film tube;
(b) a blown film die operable for producing the flow of the molten film tube;
(c) a unidirectional cooling element for receiving the flow of the molten film tube, the unidirectional cooling element having a unidirectional cooling interface operable for expelling a cooling gas in a path with the flow of the molten film tube toward a first exit gap;
(d) a divergent cooling element for receiving the flow of the molten film tube operably stacked adjacent the unidirectional cooling element, the divergent cooling element having a divergent cooling interface operable for expelling a cooling gas (i) in a path opposing the flow of the molten film tube toward a second exit gap and (ii) in a path with the flow of the molten film tube toward a third exit gap;
(e) one of a single flow air ring, a dual flow air ring, a triple flow air ring, and a multiple flow air ring having an air ring cooling interface adjacent the divergent cooling element, operable to expel cooling gas in the path with the flow of the molten film tube; and
(f) at least one stabilizer ring stacked adjacent to the divergent cooling element between the air ring cooling interface and the flow of the molten film tube, the at least one stabilizer ring operable to stabilize the flow of the molten film tube as the flow of the molten film tube enters the air ring cooling interface, wherein the at least one stabilizer ring is operably spaced from the air ring cooling interface allowing at least a portion of the expelled cooling gas to flow there between.

15. The apparatus according to claim 14, the apparatus further comprising a first stabilizer ring operably stacked adjacent the unidirectional cooling element between the unidirectional cooling element and the divergent cooling element, and a second stabilizer ring operably stacked adjacent the divergent cooling element between the first stabilizer ring and the divergent cooling element.

16. The apparatus according to claim 15, wherein the first stabilizer ring and the second stabilizer ring is sufficiently spaced from the molten film tube to allow a flow of expelled cooling gas between the first and the second stabilizer rings and the molten film tube.

17. The apparatus according to claim 16, wherein the first stabilizer ring is spaced from the unidirectional cooling element and the second stabilizer ring is spaced from the divergent cooling element to allow a flow of expelled cooling gas between (i) the unidirectional cooling element and the first stabilizer ring, and (ii) the divergent cooling element and the second stabilizer ring.

18. The apparatus according to claim 15, the apparatus further comprising a spaced apart third stabilizer ring and a spaced apart fourth stabilizer ring, each operably stacked between the unidirectional and the divergent cooling element.

19. The apparatus according to claim 18, wherein the first stabilizer ring, the second stabilizer ring, the third stabilizer ring, the fourth stabilizer ring, the unidirectional cooling element, and the divergent cooling element are each spaced from one another to allow a flow of expelled cooling gas there between.

20. The apparatus according to claim 14, wherein the first exit gap defines a minimum gap between the unidirectional cooling interface and the flow of the molten film tube, and wherein the second and third exit gaps define a minimum gap between the divergent cooling interface and the flow of the molten film tube.

* * * * *